(12) United States Patent
Kawabe

(10) Patent No.: US 6,654,510 B1
(45) Date of Patent: Nov. 25, 2003

(54) IMAGE PROCESSING METHOD AND IMAGE PROCESSING SYSTEM

(75) Inventor: Toru Kawabe, Hino (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 09/408,780

(22) Filed: Sep. 30, 1999

(30) Foreign Application Priority Data

Oct. 14, 1998 (JP) ............................... 10-291668

(51) Int. Cl.$^7$ .............................. G06K 9/32; H04N 1/46
(52) U.S. Cl. ..................... 382/298; 382/300; 358/1.2; 358/532
(58) Field of Search ................. 382/261, 266, 382/274, 279, 298, 299, 300, 305; 358/1.2, 447, 451, 463, 525, 528, 532, 296, 487; 345/606, 608, 609, 610, 615, 660, 670, 671

(56) References Cited

U.S. PATENT DOCUMENTS

| | | | |
|---|---|---|---|
| 4,682,230 A | | 7/1987 | Perlman et al. ............. 348/616 |
| 4,907,284 A | * | 3/1990 | Ohuchi ....................... 382/298 |
| 5,327,257 A | | 7/1994 | Hrytzak et al. ............. 358/447 |
| 5,696,850 A | * | 12/1997 | Parulski et al. ............. 382/261 |
| 6,301,395 B1 | * | 10/2001 | Nishigaki et al. ........... 382/266 |
| 6,373,592 B1 | * | 4/2002 | Ito .............................. 358/1.2 |

FOREIGN PATENT DOCUMENTS

EP 0 901 104 A2 3/1999

OTHER PUBLICATIONS

Patent Abstracts of Japan, vol. 1998, No. 02, Jan. 30, 1998 and JP 09-270962 A (NEC Corp.), Oct. 14, 1997—Abstract.
Patent Abstracts of Japan, vol. 1999, No. 11, Sep. 30, 1999 and JP 11-150656 A (Dianippon Screen Mfg. Co. Ltd), Jun. 2, 1999—Abstract.

* cited by examiner

Primary Examiner—Bhavesh M. Mehta
Assistant Examiner—Kanji Patel
(74) Attorney, Agent, or Firm—Frishauf, Holtz, Goodman & Chick, P.C.

(57) ABSTRACT

An image processing system is provided which includes an input device for inputting first image data; and a processor for processing the first image data inputted by the input device so as to obtain second image data and for then outputting the second image data to an output device. The output device outputs an image on an image recording medium based on the second image data. The processor processes the first image data in accordance with at least one of a condition of a sharpness enhancing process, a condition of a noise eliminating process, a sequential order in the image processing and a number of times of the image processing.

14 Claims, 11 Drawing Sheets

REGION 1   REGION 2

(a) CROSS SECTION OF IDEAL EDGE WITHOUT BLURRING (b) CROSS SECTION OF BLURRED EDGE (c) LAPLACEAN OF (b)

(d) (b) - (c)

| 0 | -1 | 0 |
|---|----|---|
| -1 | 5 | -1 |
| 0 | -1 | 0 |

(e) SHARPNESS ENHANCING FILTER $[x] \leq x < [x]+1$
$[y] \leq y < [y]+1$

LOAD MATRIX W(k, l)

INPUT IMAGE f(m, n)

(i, j)

PRODUCT AND SUM

OUTPUT IMAGE g(m, n)

(i, j)

$-1/2 \leq x < 1/2$ OR $-1/2 < x \leq 1/2$
$-1/2 \leq y < 1/2$ OR $-1/2 < y \leq 1/2$ $-1/2 \leqq x < 1/2$ OR $-1/2 < x \leqq 1/2$
$-1/2 \leqq y < 1/2$ OR $-1/2 < y \leqq 1/2$

IMAGE PROCESSING METHOD AND IMAGE PROCESSING SYSTEM

BACKGROUND OF THE INVENTION

The present invention relates to an image processing method and an image processing system.

Conventionally, for example, in a photofinishing laboratory so called as "Mini-Labo", a work to produce a regular print is conducted with an operation by an operator in accordance with a request of a customer and the thus produced print is instantly handed to the customer. Further, recently, there is a well-known apparatus in which a print is produced based on image data obtained by photoelectrically reading an original, based on image data inputted directly by CD-ROM or a communication line, or based on image data read from a card having a memory in which plural frame image data photographed by a digital camera are stored.

Incidentally, in the apparatus to produce a print based on the above image data, since it is possible to process the image data by various types of image processing methods, in addition to the production of the regular print, the request of a customer includes, for example, the production of a large size print, the production of a lay-out print in which an image is rotated or rearranged, a process to print by dodging or to add a burn-in effect, or the production of a processed print applied with a special effect by a sharpness conversion process. Accordingly, inputting means to input various kinds of image information, outputting means to output image data and an image processing in accordance with various service menus are needed.

SUMMARY OF THE INVENTION

The present invention has been made in view of above points and the object of the present invention is to provide an image processing method and an image processing system capable of always obtaining a high quality image by conducting an image processing in accordance with various conditions such as characteristics of an image, an input condition and an output condition.

In order to solve the above problems and to attain the above object, the present invention is made as follows.

An image processing system, is provided with:

a input device to input first image data;

a processor to apply an image processing onto the first image data inputted by the input device so as to obtain second image data and to output the second image data to an output device;

the output device to output an image on an image recording medium based on the second image data; and the processor applying the image processing onto the first image data in accordance with at least one of a condition of a sharpness enhancing process, a condition of an noise eliminating process, a sequential order in the image processing and a number of times of the image processing which are determined based on at least one of an input condition of the first image data inputted by the input device, a photographing condition of the first image data, a type of film on which an image corresponding to the first image data are recorded, a density of the image on the film corresponding to the first image data, a S/N characteristics of the first image data, an enlarging or reducing ratio of an enlarging or reducing process applied to the first image data, an image output format by the output device, and an output condition of the output device.

An image processing system is provided with:

a input device to input first image data;

a processor to apply an image processing including an enlarging or reducing process and a process corresponding to an output format of the output device onto the first image data inputted by the input device so as to obtain second image data and to output the second image data to an output device;

the output device to output an image on an image recording medium based on the second image data; and the processor applying an enlarging or reducing process onto the first image data in accordance with an interpolating algorithm in the enlarging or reducing process which is determined in accordance with an output format of the output device.

An image processing system is provided with:

a input device to input first image data;

a processor to apply an image processing including an enlarging or reducing process onto the first image data inputted by the input device so as to obtain second image data and to output the second image data to an output device;

the output device to output an image on an image recording medium based on the second image data; and the processor applying an enlarging or reducing process onto the first image data in accordance with an interpolating algorithm in the enlarging or reducing process which is determined in accordance with an enlarging or reducing ratio in the enlarging or reducing process.

An image processing method has steps of:

inputting first image data;

determining at least one of a condition of a sharpness enhancing process, a condition of an noise eliminating process, a sequential order in the image processing and a number of times of the image processing based on at least one of an input condition of the first image data inputted by the input device, a photographing condition of the first image data, a type of film on which an image corresponding to the first image data are recorded, a density of the image on the film corresponding to the first image data, a S/N characteristics of the first image data, an enlarging or reducing ratio of an enlarging or reducing process applied to the first image data, an image output format by the output device, and an output condition of the output device;

applying an image processing onto the first image data inputted by the input device in accordance with the determined processing condition so as to obtain second image data; and outputting the second image data to an output device.

An image processing method has steps of:

inputting first image data;

determining an interpolating algorithm in an enlarging or reducing process in accordance with an output format of the output device;

applying an image processing including an enlarging or reducing process in accordance with the determined interpolating algorithm in the enlarging or reducing process so as to obtain second image data; and outputting the second image data to an output device.

An image processing method has steps of:

inputting first image data;

determining an interpolating algorithm in an enlarging or reducing process in accordance with an enlarging or reducing ratio of the enlarging or reducing process applied to the first image data;

applying an image processing including an enlarging or reducing process in accordance with the determined interpolating algorithm in the enlarging or reducing process so as to obtain second image data; and outputting the second image data to an output device.

Further, the above object can be attained by the following preferable method and system.

(1) In an image processing method in which an image processing including a sharpness enhancing process is conducted at least once for image information inputted by an inputting means for inputting image information and image data subjected to the image processing are outputted to an outputting means, a condition of the sharpness enhancing process is changed interlockingly with the inputting means.

With the technique of (1), for example, in the case of an input means in which only image information having low S/N is obtained due to the difference of noise inclusion to the image by the input means such as different types of scanners, different types of media, and the like, images having high sharpness are not obtained because noise becomes distinct even under a certain degree of sharpness enhancing process. However, in the case of the input means in which image information having high S/N is obtained, the above-mentioned restriction is not applied and additional sharpness enhancing process may be applied. As a result, it is possible to output high quality images having higher sharpness by varying conditions for the sharpness enhancing process in response to the input means.

(2) In an image processing method in which an image processing including a sharpness enhancing process is conducted at least once for image information inputted by an inputting means for inputting image information and image data subjected to the image processing are outputted to an outputting means, a condition of the sharpness enhancing process is changed interlockingly with a photographing condition of the image information inputted by the inputting means.

With the technique of (2), for example, in the case of an input means in which only image information having low S/N is obtained due to the difference of noise inclusion to the image by the input means such as different types of scanners, different types of media, and the like, images having high sharpness are not obtainable because noise becomes distinct even under a certain degree of the sharpness enhancing process. However, in the case of the input means in which image information having high S/N is obtainable, the above-mentioned restriction does not apply and additional sharpness enhancing process may do. As a result, it is possible to output high quality images having higher sharpness by varying conditions for the sharpness enhancing process in response to the input means.

(3) The photographing condition of the image information is a storage time of the photographed image.

With the technique of (3), for example, the longer the storage time (shutter speed), the higher S/N becomes, while the shorter the storage time, the lower S/N becomes. Therefore, it becomes possible to output high quality images with higher sharpness by varying conditions for the sharpness enhancing process in response to the storage time for imaging.

(4) In an image processing method in which an image processing including a sharpness enhancing process is conducted at least once for image information inputted by an inputting means for inputting image information recorded in a film and image data subjected to the image processing are outputted to an outputting means, a condition of the sharpness enhancing process is changed interlockingly with the type of the film.

With the technique of (4), for example, in the case of negative film, the amount of transmitted light through the portion corresponding to the highlights is small and S/N is degraded. On the resulting print, it corresponds to low density portions and noise is noted visually. On the other hand, in the case of reversal film, the amount of transmitted light through the portions corresponding to the shadow is small, and S/N is degraded. On the resulting print, it corresponds to the high density portions, and noise is not so visually noted. Therefore, it is possible to output high quality images with higher sharpness by varying the conditions for the sharpness enhancing process in response to the type of film.

(5) In an image processing method in which an image processing including a sharpness enhancing process is conducted at least once for image information inputted by an inputting means for inputting image information recorded in a film and image data subjected to the image processing are outputted to an outputting means, a condition of the sharpness enhancing process is changed interlockingly with the density of the image information recorded in the film.

With the technique of (5), for example, as the density of framed images in film is lowered, S/N is raised, while when the density is raised, S/N is lowered. Therefore, it becomes possible to output high quality images with higher sharpness by varying conditions for the sharpness enhancing process in response to the density of the image information recorded on film.

(6) In an image processing method in which an image processing including a sharpness enhancing process is conducted at least once for image information inputted by an inputting means for inputting image information and image data subjected to the image processing are outputted to an outputting means, a condition of the sharpness enhancing process is changed interlockingly with a S/N property of the image information inputted by the inputting means.

With the technique of (6), when the analytical results for inputted image data reveal images with low S/N or images having many flat portions, image properties having high sharpness are not obtained because noise becomes distinct even under a certain degree of the sharpness enhancing process. However, in the case of images having high S/N or having a small number of flat portions, the above-mentioned restrictions do not apply and more enhancing process may be employed. As a result, it becomes possible to output high quality images with higher sharpness by varying conditions for the sharpness enhancing process.

(7) In an image processing method in which an image processing including a sharpness enhancing process and an enlarging reducing process is conducted at least once for image information inputted by an inputting means for inputting image information and image data subjected to the image processing are outputted to an outputting means, a condition of the sharpness enhancing process is changed interlockingly with an enlarging or reducing ratio in the image processing.

With the technique of (7), since the degree of sharpness enhancement which is required to obtain the same sharpness becomes different in accordance with the enlarging or reducing ratio in image processing, by varying the degree of the sharpness enhancement in response to the enlarging or reducing ratio, it is possible to output images having optimal sharpness, irrespective of the enlarging or reducing ratio. Furthermore, depending on the interpolation algorithm, occasionally major problems occur due to moire phenomena caused by problems such as noise near the specified enlarging or reducing ratio. However, it is possible to minimize the generation of said moire problems by restricting the sharpness enhancing process near such ratio.

(8) In an image processing method in which an image processing including a sharpness enhancing process and a process corresponding to a service menu is conducted at least once for image information inputted by an inputting means for inputting image information and image data subjected to the image processing are outputted to an outputting means, a condition of the sharpness enhancing process is changed interlockingly with the service menu.

With the technique of (8), for example, in portraits, or identification photos in which a person is the main subject, skin roughness is more minimized than for other general service pictures, and further soft pictures are preferred. Accordingly, for example, in the case of identification photo menu, it is possible to provide optimal quality images by varying conditions for the sharpness enhancing process in response to the service menu, while varying sharpness enhancement properties. Furthermore, it is possible to realize representations such as realistic photographic gradation representation, or printing matter gradation representation by varying the sharpness enhancing process by matching to a gradation control for photographic gradation, printing matter gradation, and the like.

(9) In an image processing method in which an image processing including a sharpness enhancing process is conducted at least once for image information inputted by an inputting means for inputting image information and image data subjected to the image processing are outputted to an outputting means, a condition of the sharpness enhancing process is changed interlockingly with the outputting means.

With the technique of (9), when for example, sharpness degradation properties during recording become different due to the output means, in advance, sharpness enhancement is carried out in response to those properties and conditions for the sharpness enhancing process vary in response to the output means, whereby it is possible to provide optimal quality images without the relation with the output means.

(10) The sharpness enhancing process is a spatial filtering process with a size of 5×5 or less.

With the technique of (10), by carrying out such spatial filtering process with a size of 5×5 or less, the sharpness enhancing process can be realized at a high rate employing a low cost hardware resource.

(11) The change of the sharpness enhancing process is to change the size of the spatial filtering coefficient.

With the technique of (11), image sharpness may be controlled by changing the enhancement degree at the edge portions by changing the size of the spatial filtering coefficient.

(12) The change of the sharpness enhancing process is to change frequency characteristics.

With the technique of (12), by varying the frequency characteristics of the sharpness enhancing process, the granular appearance properties of an image due to noise and visual appearance vary. For example, when the enhancement degree of a low frequency component is relatively large, a granular appearance tends to be visually noticeable. However, moire phenomena accompanied with the enlarging or reducing process tend not to occur. On the other hand, when the enhancement degree of a high frequency component is relatively large, said granular appearance tends not to be visually noticed, while the moire phenomena accompanied with the enlarging and reducing process, tends to occur.

(13) In an image processing method in which an image processing including an enlarging.reducing process is conducted at least once for image information inputted by an inputting means for inputting image information and image data subjected to the image processing are outputted to an outputting means, an interpolation algorithm in the enlarging.reducing process is changed interlockingly with an enlarging or reducing ratio in the image processing.

With the technique of (13), depending on the interpolation algorithm for the enlarging or reducing ratio for the image processing, major problems occasionally occur due to the moire phenomena which are caused by defects such as noise and the like near the specified enlarging or reducing ratio. In the region near such a ratio, the bicubic system may be employed which minimizes the generation of the moire phenomena and in the case other than that, the bilinear system and the nearest neighbor system may be applied. By so doing, the processing time may be reduced and may minimize the problems due to the generation of moire phenomena without decreasing the average processing capacity per hour to any appreciable extent.

(14) In an image processing method in which an image processing including an enlarging.reducing process and a process corresponding to a service menu is conducted at least once for image information inputted by an inputting means for inputting image information and image data subjected to the image processing are outputted to an outputting means, an interpolation algorithm in the enlarging.reducing process is changed interlockingly with the service menu.

With the technique of (14), depending on the interpolation algorithm during magnification or reduction in the image processing, major problems occur occasionally due to the moire phenomena which are caused by defects such as noise and the like near the specified enlarging or reducing ratio. However, for a service such as identification photo menu in which the order quantity is small, the problems are minimized by employing the bicubic system which is not likely to generate the moire phenomena, and in cases other than that, by employing the bilinear system or the nearest neighbor system, the processing time may be decreased and thereby raise the average processing capacity per hour.

(15) In an image processing system in which an image processing including a sharpness enhancing process is conducted at least once for image information inputted by an inputting means for inputting image information and image data subjected to the image processing are outputted to an outputting means, a condition of the sharpness enhancing process is changed interlockingly with the inputting means.

With the system of (15), for example, in the case of an input means in which only image information having low S/N is obtained due to the difference of noise inclusion to the image by the input means such as different types of scanners, different types of media, and the like, images having high sharpness are not obtained because noise becomes distinct even under a certain degree of sharpness enhancing process. However, in the case of the input means in which image information having high S/N is obtained, the above-mentioned restriction is not applied and additional sharpness enhancing process may be applied. As a result, it is possible to output high quality images having higher sharpness by varying conditions for the sharpness enhancing process in response to the input means.

(16) In an image processing system in which an image processing including a sharpness enhancing process is conducted at least once for image information inputted by an inputting means for inputting image information and image data subjected to the image processing are outputted to an outputting means, a condition of the sharpness enhancing process is changed interlockingly with a photographing condition of the image information inputted by the inputting means.

With the system of (16), for example, in the case of an input means in which only image information having low S/N is obtained due to the difference of noise inclusion to the image by the input means 80 such as different types of scanners, different types of media, and the like, images having high sharpness are not obtainable because noise becomes distinct even under a certain degree of the sharpness enhancing process. However, in the case of the input means in which image information having high S/N is obtainable, the above-mentioned restriction does not apply and additional sharpness enhancing process may do. As a result, it is possible to output high quality images having higher sharpness by varying conditions for the sharpness enhancing process in response to the input means.

(17) The photographing condition of the image information is a storage time of the photographed image.

With the system of (17), for example, the longer the storage time (shutter speed), the higher S/N becomes, while the shorter the storage time, the lower S/N becomes. Therefore, it becomes possible to output high quality images with higher sharpness by varying conditions for the sharpness enhancing process in response to the storage time for imaging.

(18) In an image processing system in which an image processing including a sharpness enhancing process is conducted at least once for image information inputted by an inputting means for inputting image information recorded in a film and image data subjected to the image processing are outputted to an outputting means, a condition of the sharpness enhancing process is changed interlockingly with the type of the film.

With the system of (18), for example, in the case of negative film, the amount of transmitted light through the portion corresponding to the highlights is small and S/N is degraded. On the resulting print, it corresponds to low density portions and noise is noted visually. On the other hand, in the case of reversal film, the amount of transmitted light through the portions corresponding to the shadow is small, and S/N is degraded. On the resulting print, it corresponds to the high density portions, and noise is not so visually noted. Therefore, it is possible to output high quality images with higher sharpness by varying the conditions for the sharpness enhancing process in response to the type of film.

(19) In an image processing system in which an image processing including a sharpness enhancing process is conducted at least once for image information inputted by an inputting means for inputting image information recorded in a film and image data subjected to the image processing are outputted to an outputting means, a condition of the sharpness enhancing process is changed interlockingly with the density of the image information recorded in the film.

With the system of (19), for example, as the density of framed images in film is lowered, S/N is raised, while when the density is raised, S/N is lowered. Therefore, it becomes possible to output high quality images with higher sharpness by varying conditions for the sharpness enhancing process in response to the density of the image information recorded on film.

(20) In an image processing system in which an image processing including a sharpness enhancing process is conducted at least once for image information inputted by an inputting means for inputting image information and image data subjected to the image processing are outputted to an outputting means, a condition of the sharpness enhancing process is changed interlockingly with a S/N property of the image information inputted by the inputting means.

With the system of (20), when the analytical results for inputted image data reveal images with low S/N or images having many flat portions, image properties having high sharpness are not obtained because noise becomes distinct even under a certain degree of the sharpness enhancing process. However, in the case of images having high S/N or having a small number of flat portions, the above-mentioned restrictions do not apply and more enhancing process may be employed. As a result, it becomes possible to output high quality images with higher sharpness by varying conditions for the sharpness enhancing process.

(21) In an image processing system in which an image processing including a sharpness enhancing process and an enlarging.reducing process is conducted at least once for image information inputted by an inputting means for inputting image information and image data subjected to the image processing are outputted to an outputting means, a condition of the sharpness enhancing process is changed interlockingly with an enlarging or reducing ratio in the image processing.

With the system of (21), since the degree of sharpness enhancement which is required to obtain the same sharpness becomes different in accordance with the enlarging or reducing ratio in image processing, by varying the degree of the sharpness enhancement in response to the enlarging or reducing ratio, it is possible to output images having optimal sharpness, irrespective of the enlarging or reducing ratio. Furthermore, depending on the interpolation algorithm, occasionally major problems occur due to moire phenomena caused by problems such as noise near the specified enlarging or reducing ratio. However, it is possible to minimize the generation of said moire problems by restricting the sharpness enhancing process near such ratio.

(22) In an image processing system in which an image processing including a sharpness enhancing process and a process corresponding to a service menu is conducted at least once for image information inputted by an inputting means for inputting image information and image data subjected to the image processing are outputted to an outputting means, a condition of the sharpness enhancing process is changed interlockingly with the service menu.

With the system of (22), for example, in portraits, or identification photos in which a person is the main subject, skin roughness is more minimized than for other general service pictures, and further soft pictures are preferred. Accordingly, for example, in the case of identification photo menu, it is possible to provide optimal quality images by varying conditions for the sharpness enhancing process in response to the service menu, while varying sharpness enhancement properties. Furthermore, it is possible to realize representations such as realistic photographic gradation representation, or printing matter gradation representation by varying the sharpness enhancing process by matching to a gradation control for photographic gradation, printing matter gradation, and the like.

(23) In an image processing system in which an image processing including a sharpness enhancing process is conducted at least once for image information inputted by an inputting means for inputting image information and image data subjected to the image processing are outputted to an outputting means, a condition of the sharpness enhancing process is changed interlockingly with the outputting means.

With the system of (23), when for example, sharpness degradation properties during recording become different due to the output means, in advance, sharpness enhancement is carried out in response to those properties and conditions for the sharpness enhancing process vary in response to the output means, whereby it is possible to provide optimal quality images without the relation with the output means.

(24) The sharpness enhancing process is a spatial filtering process with a size of 5×5 or less.

With the system of (24), by carrying out such spatial filtering process with a size of 5×5 or less, the sharpness enhancing process can be realized at a high rate employing a low cost hardware resource.

(25) The change of the sharpness enhancing process is to change the size of the spatial filtering coefficient.

With the system of (25), image sharpness may be controlled by changing the enhancement degree at the edge portions by changing the size of the spatial filtering coefficient.

(26) The change of the sharpness enhancing process is to change frequency characteristics.

With the system of (26), by varying the frequency characteristics of the sharpness enhancing process, the granular appearance properties of an image due to noise and visual appearance vary. For example, when the enhancement degree of a low frequency component is relatively large, a granular appearance tends to be visually noticeable. However, moire phenomena accompanied with the enlarging or reducing process tend not to occur. On the other hand, when the enhancement degree of a high frequency component is relatively large, said granular appearance tends not to be visually noticed, while the moire phenomena accompanied with the enlarging and reducing process, tends to occur.

(27) In an image processing system in which an image processing including an enlarging.reducing process is conducted at least once for image information inputted by an inputting means for inputting image information and image data subjected to the image processing are outputted to an outputting means, an interpolation algorithm in the enlarging.reducing process is changed interlockingly with an enlarging or reducing ratio in the image processing.

With the system of (27), depending on the interpolation algorithm for the enlarging or reducing ratio for the image processing, major problems occasionally occur due to the moire phenomena which are caused by defects such as noise and the like near the specified enlarging or reducing ratio. In the region near such a ratio, the bicubic system may be employed which minimizes the generation of the moire phenomena and in the case other than that, the bilinear system and the nearest neighbor system may be applied. By so doing, the processing time may be reduced and may minimize the problems due to the generation of moire phenomena without decreasing the average processing capacity per hour to any appreciable extent.

(28) In an image processing system in which an image processing including an enlarging.reducing process and a process corresponding to a service menu is conducted at least once for image information inputted by an inputting means for inputting image information and image data subjected to the image processing are outputted to an outputting means, an interpolation algorithm in the enlarging.reducing process is changed interlockingly with the service menu.

With the system of (28), depending on the interpolation algorithm during magnification or reduction in the image processing, major problems occur occasionally due to the moire phenomena which are caused by defects such as noise and the like near the specified enlarging or reducing ratio. However, for a service such as identification photo menu in which the order quantity is small, the problems are minimized by employing the bicubic system which is not likely to generate the moire phenomena, and in cases other than that, by employing the bilinear system or the nearest neighbor system, the processing time may be decreased and thereby raise the average processing capacity per hour.

DETAILED DESCRIPTION OF THE PREFERRED EMBODIMENT

The embodiments of the image processing method and image processing system of the present invention will be described with reference to drawings. However, the image processing method and image processing system of the present invention are not limited to the present embodiments. In the present invention, a print producing device to produce prints, a device which allows an image storage device to store image data, a transmission device which transmits image data via LAN, and the like may employed as an output device. Actually, as a preferable embodiment, a print producing system having a print producing device is employed as the output device. In this embodiment, the present invention is applied to a print producing apparatus as well as to a print producing system.

Figure 1:
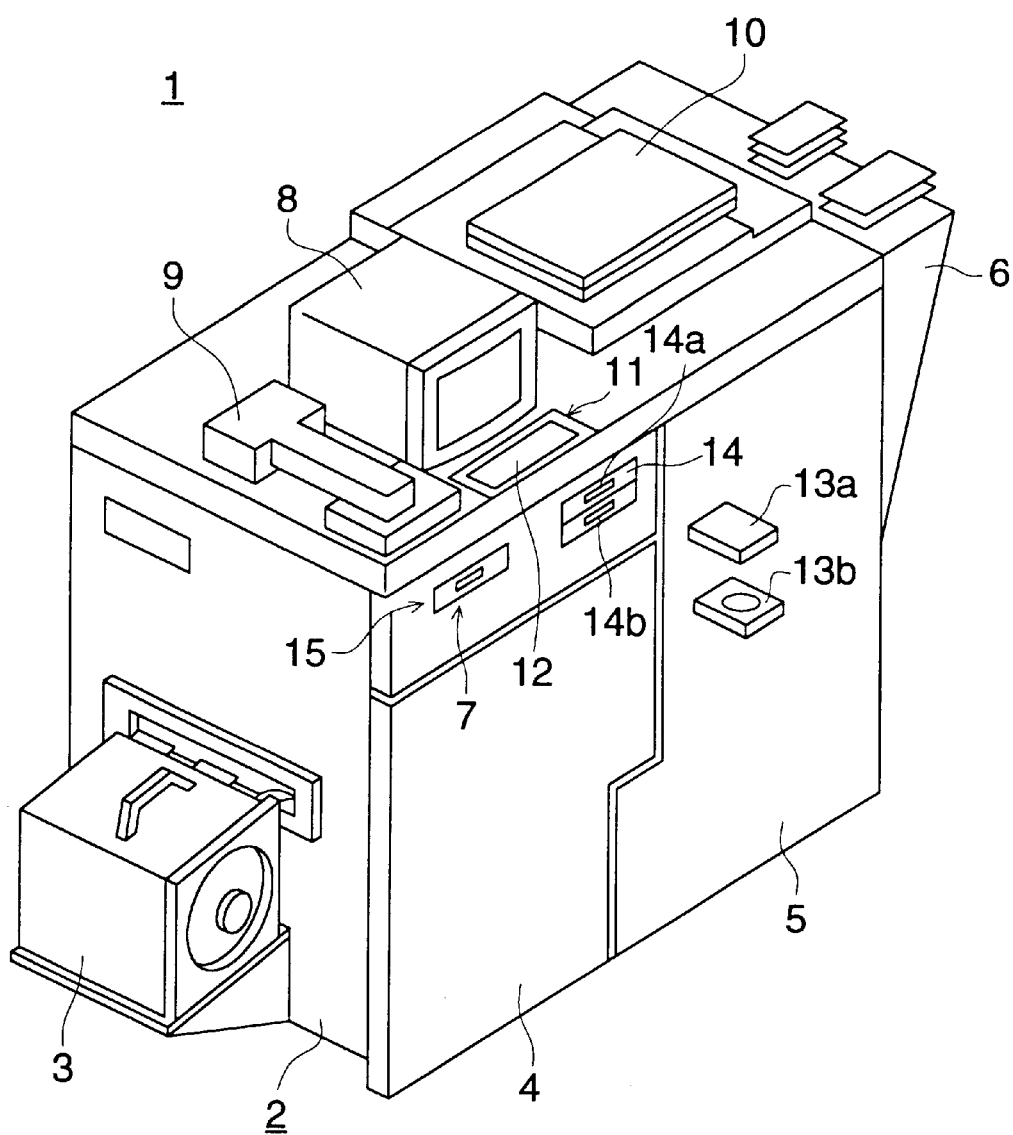
FIG. 1 is a perspective view of a print producing apparatus and a print producing system.

FIG. 1 is a perspective view of a print producing apparatus, as well as a print producing system. Here, exemplified as a print producing apparatus is one which exposes photosensitive materials, develops those exposed materials, and produces prints. However, the present invention is not limited to these but includes print producing apparatuses employing an ink jet system as well as an electrophotographic system, which can produce prints based on image data. In the present invention, preferred is a system employing photosensitive materials.

Print producing apparatus 1, as the present embodiment, is provided with magazine loading section 3 on the left side of apparatus main body 2. Provided in the interior of the apparatus main body 2, are exposure section 4, which exposes photosensitive materials employed as recording media, as well as print producing section 5, which photographically processes exposed photosensitive materials, dries the same exposed, and produces prints, and produced prints are ejected onto a tray provided on the right side surface of the apparatus main body 2. Further, provided in the interior of the apparatus main body above the exposure section 4 is control section 7.

Still further, arranged in the upper part of the apparatus main body 2, is CRT 8. Said CRT 8 serves as a display means which shows images based on image data to be printed. Arranged on the left side of the CRT 8 is scanner 9, which is a transparent original document reading unit and arranged on the right side is reflection type original document inputting unit 10.

As original documents which are read by film scanner 9 and reflection type original document input unit 10, are photosensitive photographic materials. Listed as such photosensitive photographic materials are color negative film and color reversal film, which record framed image information captured by an analogue camera. Conversion to digital information is carried out employing a film scanner in the film scanner 9 to make it possible to convert to framed image information. Further, when the photosensitive photographic material is color paper, framed image information may be generated employing the flat-bed scanner of reflection type original document input unit 10.

Further, in the control section 7 of the apparatus main body 2, image transmitting section 14 is installed. Provided in the image transmitting section 14 are PC card adapter 14a as well as for floppy disk adapter 14b, and PC card 13a and floppy disk 13b, respectively can be inserted. The PC card 13a stores a plurality of sets of framed image information captured by a digital camera. The floppy disk 13a stores image information such as, for example, a plurality of sets of framed image information captured by a digital camera.

Arranged on the front of the CRT 8 is the operating section 11, in which information input means 12 is provided, which is comprised of, for example, a touch panel or the like.

Furthermore, provided in the apparatus main body 2, is recording media writing section 15. When prints are produced upon outputting all framed image information from recording media comprising a plurality of sets of framed image information such as photosensitive photographic material N, PC card 13a, floppy disk 13b, and the like, the apparatus main body 2 comprises writing means K which writes all framed image informations on magnetic media or light recording media.

Listed as recording media comprising the framed image information according to the present invention, other than those described above, are a multimedia card, a memory stick, MG data, and OROM.

Further, integrally provided in the apparatus main body 2 are the control section 11, the CRT 8, the film scanner 9, the reflection type original document inputting device 10, the image transmitting section 14, and the recording media writing section 15. However, at least one of them may be provided separately. In such a case, the print production apparatus 1 is treated as a print producing system.

Figure 2:
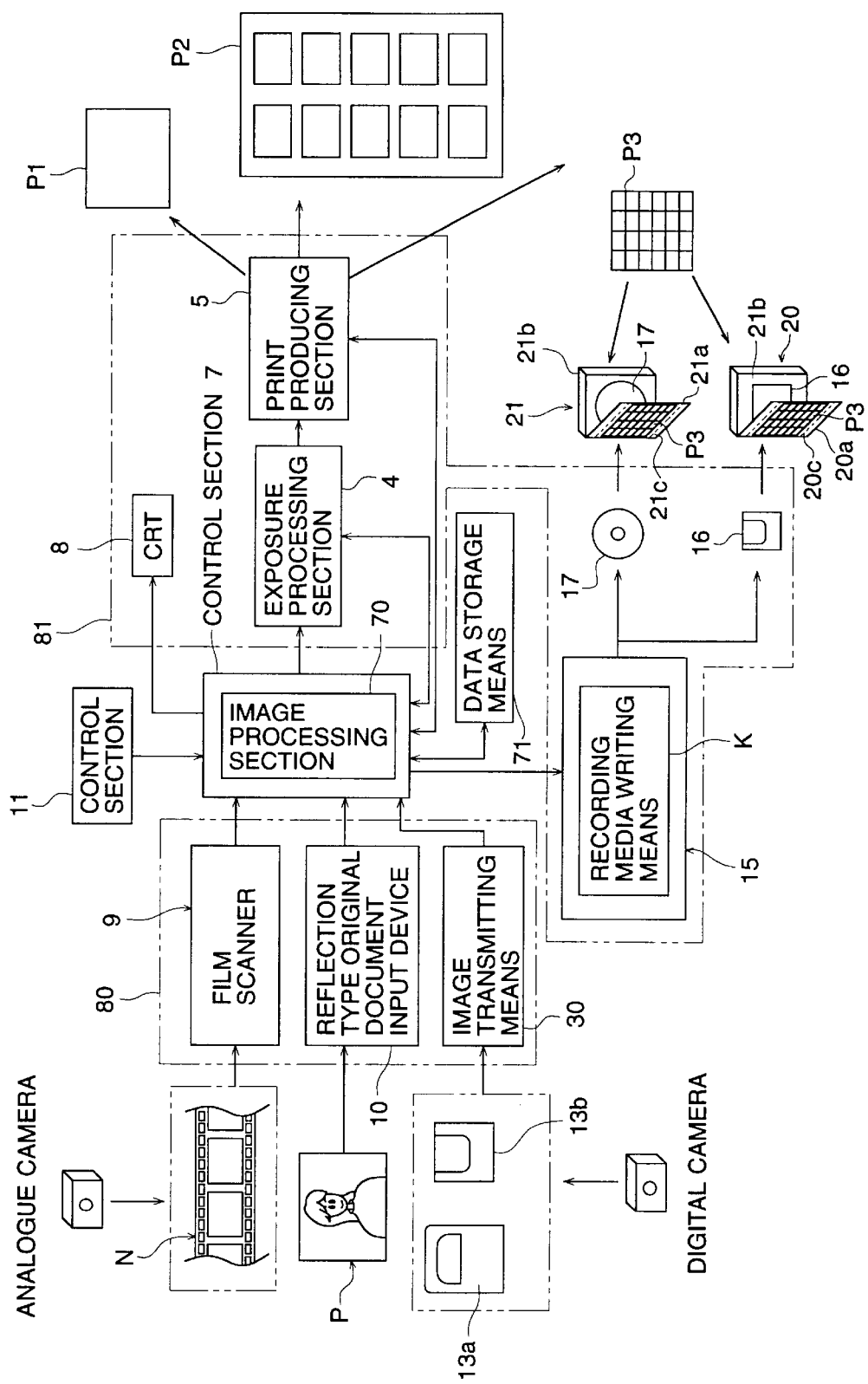
FIG. 2 is a schematic constitution view of a print producing apparatus and a print producing system.

FIG. 2 is a schematic constitution view of a print producing apparatus as well as of a print producing system.

Control section 7 of the print producing apparatus 1 reads original document information employing the film scanner section 9 as well as reflection type original document inputting device 10 based on the instruction information, and displays the obtained image data on the CRT 8.

Furthermore, the print producing apparatus 1 is provided with data storing means 71, which successively stores image data and corresponding ordering information (such information as the number of prints for specified frames, print size information, and the like). Framed images of negative film N, developed after being subjected to image exposure employing an analog camera, are inputted from the film scanner 9, and from the reflection type original document inputting device 10, inputted is imaged frames from print P prepared by exposing framed images onto photographic paper and photographically processing the exposed photographic paper.

Furthermore, the control section 7 comprises image processing section 70 in which image data are subjected to image processing to form image data for exposure which are transmitted to the exposure processing section 4. In the exposure processing section 4, a photosensitive material is exposed imagewise, and the exposed photosensitive material is conveyed to the print producing section 5 and is photographically processed and dried, to produce the final prints.

Provided in this print producing apparatus 1 is image transmitting section 14 which reads framed image information in PC card 13 or floppy disk 13b in which images captured by a digital camera are stored. Provided in this image transmitting section 14 is an adapter for PC card, floppy disk, or the like as image transmitting means 30. PC card 13a is inserted into the PC card adapter 14a, or the floppy disk 13b is inserted into the floppy disk adapter 14b, and framed image information recorded in the PC card 13a or floppy disk 13b is read and is transmitted to the control section 7 comprised of microcomputers. Employed as the adapter 14a for PC card are, for example, a PC card reader, a PC card slot, and the like.

Carried out in this print producing apparatus 1 are common prints P1, file prints P2, and index prints P3. The production of common prints P1 is carried out in such a manner that one piece of framed image data is recorded onto a sheet of recording media. In such a common print P1, for example, a square composite area is set in the background, having a specified pattern, and in the square composite area, one framed image is composed and recorded, and print P1 of a common print size may be produced, which is decorated with a photoframe. In such a manner, by recording one piece of framed image data in print P1 of one sheet of recording media, for example, specified prints may be prepared which can be placed in a wallet or a commuter pass holder according to a client́s preference and subsequent order.

Furthermore, a file print P2 is produced by recording a plurality of framed images onto a recording medium of a large file. For example, a printing system is one in which in a recording medium, a plurality of arranged images are printed and the resulting print may be filed, as it is, in an album file and the like, and in addition in which images may be recorded in a recording medium in which image frames, unexposed areas, note columns, and the like are previously designed. Even in this file print P2, for example, 3 through 10 composite areas are set in the background image having a specified pattern, and in these 3 composite areas, each of one framed image may be composed and recorded. Further, in a file print P2, in the background, cutting lines may be recorded. Employing the cutting lines, specifically ordered prints can be easily and clean cut so that the same can be placed in a wallet or a commuter pass holder.

In index print P3, all data of framed image information are employed to produce prints on a recording medium having a specified print size to improve the likelihood to receive repeated print orders.

In this print producing apparatus 1, recording media writing section 15 is provided which writes all framed image information into recording media in magnetic recording media or light recording media, when outputting all framed image information into this recording media from the recording media having a plurality of sets of framed image information and producing prints. Writing means K, provided in the recording media writing section 15, writes all sets of framed image information in the recording media stored in data storing means 71, in magnetic recording media 16 or light recording media 17. At the time, image data which are written in date recording media 16 or light recording media 17 by a writing means K and are stored in data storing means 71, may be those which have been subjected to image processing employing the image processing section 70 described later or have been inputted by input means 80.

Recording media comprising a plurality of sets of framed image information, as described above, are processed negative film or processed reversal film. Furthermore, the processed negative film or processed reversal film is scanned by a film scanner in the film scanner 9, and images therein are converted to digital information and transmitted to the control section 7.

Further, recording media comprising a plurality of sets of framed image information are PC card 13a or floppy disk 13b. Said PC card 13a is smart media or compact flash and said framed image information is read employing the image transmitting means 14a and subsequently transmitted to the control section 7, comprised of microcomputers.

The magnetic media 16 are selected from floppy disks, MOs or Zips and by storing image information converted from these, data storage becomes more convenient. Further, the light recording media 17 are CD-R or DVD, and by storing digital image information converted from these, said storage also becomes more convenient.

Housing cases 20 and 21, in which the magnetic recording media 16 or the light recording media 17 is placed, are in the form of one set, and have a structure which houses the index prints P3 in which all framed image information recorded in recording media is recorded.

With the housing cases 20 and 21 of this embodiment, covers 20a and 21a, as well as backs 20b and 21b can be opened and closed, and in the interior, the magentic recording media 16 or the light recording media 17 are placed. On covers 20a and 21a, transparent covering sections 20c and 21c are provided under which index print P3 is placed.

In such a manner, the housing cases 20 and 21, in which the magnetic recording media 16 or the light recording media 17 are placed, are in one set, and house index prints P3 on which all sets of framed image information recorded in recording media are recorded. Thus, storage becomes convenient and easy.

In this print producing apparatus 1, image information inputted from the input means 80, which inputs image information, is subjected to image processing containing at least one sharpness enhancing process in the image processing section 70, and the image-processed image data are then outputted to the output means 81. The input means 80 includes the film scanner 9, the reflection type original document inputting apparatus 10, the image transmitting section 14, and the like, while the output means 81 includes the CRT 8, the exposure processing section 4, the recording media writing section 15, and the like, and carry out hard copy output, display on the monitor screen or image data output to the image recording media.

The previously cited sharpness enhancing process is a process which sharpens an image by removing blurring which is one cause which degrades image quality. Image blurring is generated when a high spatial frequency component is weakened compared to a low spatial frequency component. Such an effect emerges in the boundaries (edges) of a uniform density area. Accordingly, in order to reduce blurring, a process is carried out in which high spatial frequency component is enhanced by employing a high region enhancing filter in the image space.

Figure 3:
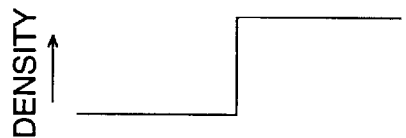
FIG. 3 is a view explaining the enhancement of sharpness of an image.
Figure 3:
Figure 3:
Figure 3:
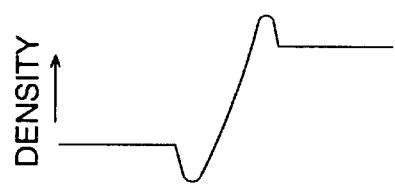

FIG. 3 shows one example of such an image sharpness enhancement method. FIG. 3(a) is a cross-sectional view of an ideal edge without any blurring, while FIG. 3(b) is a cross-sectional view of a blurred edge. FIG. 3(c) shows Laplacean of the blurred edge in FIG. 3(b). A space filter (load matrix) for a sharpness enhancing process (space filtering) applied to FIG. 3(b) is shown in FIG. 3(e).

In such a manner, when Laplacean is subtracted from an original image, as shown in FIG. 3(d), undershoot results at the lower end of the blurred edge and overshoot results at the upper end. Thus, the density gradient markedly increases and contrast at the edge is enhanced. Namely, output similar to the Mach effect which is exhibited by the human visual system is obtained by such a filter.

In order to enhance image sharpness in a spatial frequency region, image f(i, j) is subjected to Fourier transformation and the resulting Fourier transformation image F(u, v) is subjected to the action of a high region enhancing filter, and thereafter, may be subjected to reverse Fourier transformation. Employed as such a high region enhancing filter may be a monotone increasing function regarding the absolute value |u+v| of the spatial frequency.

In the present embodiment, when image data are subjected to a sharpness enhancing process, the image processing section 70 varies conditions for the sharpness enhancing process based on at least one of the conditions for capturing said first image data, the type of film on which image data are recorded, the density corresponding to said first image data on a film strip on which said first image data are recorded, the S/N characteristics of said first image data, the enlarging or reducing ratio which has been employed for enlarging or reducing said first image data, the image outputting mode employed by said output device, and the output conditions employed by the output device, which are linked with input means 80 (image data inputting conditions inputted by the input means (types of input means, conditions during inputting, and the like)). As conditions for the sharpness enhancing process, are processing conditions which enhance the high spatial frequency component. For example, in the case of an input means in which only image information having low S/N is obtained due to the difference of noise inclusion to the image by the input means 80 such as different types of scanners, different types of media, and the like, images having high sharpness are not obtained because noise becomes distinct even under a certain degree of sharpness enhancing process. However, in the case of the input means 80 in which image information having high S/N is obtained, the above-mentioned restriction is not applied and additional sharpness enhancing process may be applied. As a result, it is possible to output high quality images having higher sharpness by varying conditions for the sharpness enhancing process in response to the input means. When the conditions for the sharpness enhancing process vary in response to the input means, for example, as shown in Table 1, those vary based on the types of input means and the input method (input conditions) of the image data.

TABLE 1

| Type of Input Means or Input Method | Conditions for Sharpness Enhancing Process | Content of Noise Elimination Control |
|---|---|---|
| Means or method in which sharpness is much degraded | Increase in enhancement degree (compared to a means or method in which the degradation of sharpens is small) | Increase in threshold parameters (compared to a means or method in which the degradation of sharpens is small) |
| Means or method in which noise level is high | Restraint of enhancement degree (compared to means or method in which noise level is low) | increase in threshold parameters (compared to means or method in which noise level is low) |
| Means or method in which the degradation of high frequency component is large | increase in enhancement degree of high frequency component (compared to a means or method in which the degradation is small) | decrease in the radius parameter and limitation to the nearest area processing (compared to a means or method in which the degradation is small) |
| Means or method in which the degradation of low frequency component is large | increase in enhancement degree of low frequency component (compared to a means or method in which the degradation is small) | increase in radius parameters and smoothing over a wide area (compared to a means or method in which the degradation is small) |
| Means or method in which the noise level of high frequency component is large | restraint of enhancement degree of high frequency component (compared to a means or method in which noise level is small) | decrease in radius parameters and limitation to the nearest area processing (compared to a means or method in which noise level is small) |
| Means or method in which the noise level of low frequency component is large | restraint of enhancement degree of low frequency component | increase in radius parameters and smoothing over a wide area |

Furthermore, the conditions for the sharpness enhancement process may vary in response to image capturing conditions which are inputted to the input means 80, for example, as sown in Table 2.

TABLE 2

| Image Capturing Conditions | Conditions for Sharpness Enhancing Process | Content of Noise Elimination Control |
|---|---|---|
| Short image capturing time | restraint of enhancement degree (compared to long capturing time) | increase in threshold parameters (compared to long image capturing time) |

TABLE 2-continued

| Image Capturing Conditions | Conditions for Sharpness Enhancing Process | Content of Noise Elimination Control |
|---|---|---|
| Capturing of high resolution | shifting enhancement frequency to lower frequency (compared to image capturing of low resolution) | (compared to image capturing of low resolution) increase in radius parameters and smoothing over a wide area |

For example, in the case of an input means in which only image information having low S/N is obtained due to the difference of noise inclusion to the image by the input means 80 such as different types of scanners, different types of media, and the like, images having high sharpness are not obtainable because noise becomes distinct even under a certain degree of the sharpness enhancing process. However, in the case of the input means 80 in which image information having high S/N is obtainable, the above-mentioned restriction does not apply and additional sharpness enhancing process may do. As a result, it is possible to output high quality images having higher sharpness by varying conditions for the sharpness enhancing process in response to the input means.

For example, in a CCD provided in the film scanner 9, the longer the storage time (shutter speed), the higher S/N becomes, while the shorter the storage time, the lower S/N becomes. Therefore, it becomes possible to output high quality images with higher sharpness by varying conditions for the sharpness enhancing process in response to the storage time for imaging.

Furthermore, the conditions for the sharpness enhancing process may vary in response to the type of film, for example as shown in Table 3.

TABLE 3

| Type of Film | Conditions for Sharpness Enhancing Process | Content of Noise Elimination Control |
|---|---|---|
| High-sensitive film | restraint of enhancement degree (compared to APS film) | increase in threshold parameters (compared to APS film) |
| APS | increase in enhancement degree | decrease in radius parameter and limitation to the nearest area processing |
| Reversal film | restraint of enhancement degree (compared to APS film) | increase in threshold parameters for the density of a shadow portion and restraint of threshold parameters for the density of a highlighted portion (compared to APS film) |

For example, in the case of negative film, the amount of transmitted light through the portion corresponding to the highlights is small and S/N is degraded. On the resulting print, it corresponds to low density portions and noise is noted visually. On the other hand, in the case of reversal film, the amount of transmitted light through the portions corresponding to the shadow is small, and S/N is degraded. On the resulting print, it corresponds to the high density portions, and noise is not so visually noted. Therefore, it is possible to output high quality images with higher sharpness by varying the conditions for the sharpness enhancing process in response to the type of film.

As shown in Table 4, for example, the conditions for the sharpness enhancement process may vary based on the density corresponding to image data on the film strip on which image data are recorded by the input means.

TABLE 4

| Density Condition of Image Information | Conditions for Sharpness Enhancing Process | Content of Noise Elimination Control |
|---|---|---|
| High density | Restraint of enhancement degree (compared to low density) | increases in threshold parameters (compared to low density) |

For example, as the density of framed images in film is lowered, S/N is raised, while when the density is raised, S/N is lowered. Therefore, it becomes possible to output high quality images with higher sharpness by varying conditions for the sharpness enhancing process in response to the density of the image information recorded on film.

Furthermore, as shown in Table 5, for example, the conditions for the sharpness enhancement process may vary in response to the S/N characteristics of the image data.

TABLE 5

| S/N Characteristics of Image Data | Conditions for Sharpness Enhancing Process | Content of Noise Elimination Control |
|---|---|---|
| Low S/N | Restraint of enhancement degree (compared to low S/N) | increases in threshold parameters (compared to low S/N) |

When the analytical results for inputted image data reveal images with low S/N or images having many flat portions, image properties having high sharpness are not obtained because noise becomes distinct even under a certain degree of the sharpness enhancing process. However, in the case of images having high S/N or having a small number of flat portions, the above-mentioned restrictions do not apply and more enhancing process may be employed. As a result, it becomes possible to output high quality images with higher sharpness by varying conditions for the sharpness enhancing process.

Furthermore, when in the image processing section 70, image data are subjected to an amplifying and reducing process as well as a sharpness enhancing process, the conditions for the sharpness enhancing process may vary, for example, as shown in Table 6.

TABLE 6

| Amplifying Reducing Ratio | Conditions for Sharpness Enhancing Process | Content of Noise Elimination Control |
|---|---|---|
| High amplification ratio (low reduction ratio) | increase in enhancement degree as well as increase in enhancement degree of high frequency component (compared to low amplification ratio (high reduction ratio)) | increase in threshold parameters as well as radius parameters, and smoothing over a wide area (compared to low amplification ratio (high reduction ratio)) |

Figure 4:
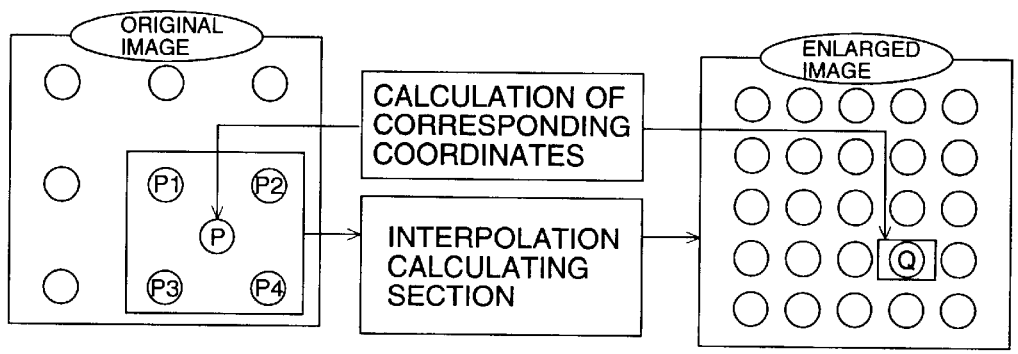
FIGS. 4(a) and 4(b) are views explaining an enlarging process of an image.
Figure 4:
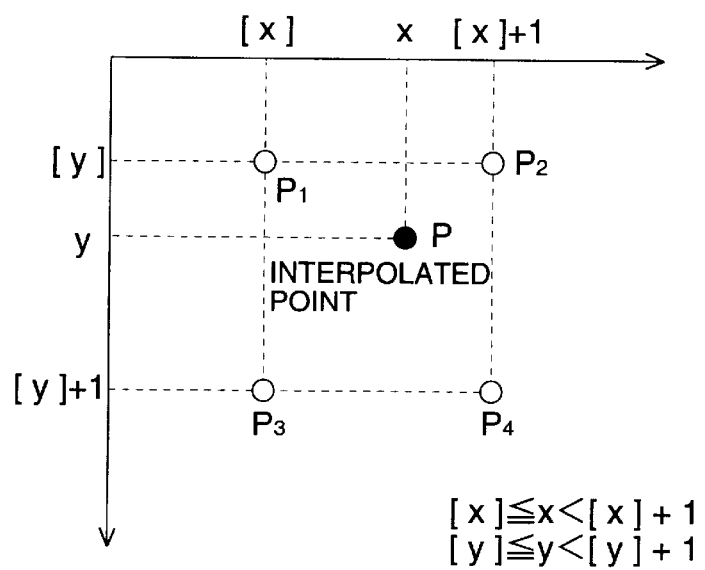

In the image enlarging or reducing process, when an image is enlarged, a process called interpolation is required for digital processing. FIG. 4 shows the interpolation process employing an example in which an original image is enlarged twice. In order to carry out image processing such as magnification, reduction, and the like, first, an original image is covered with a mesh having an inverse distance of the enlarging ratio and the lattice point is specified as one pixel of a transformed image. In the example of FIG. 4, pixel Q on a transformed image corresponds to point P on the original image. Because point P is located between pixels on the original image, to obtain its pixel data, it is necessary to carry out calculation employing pixel information around said point P. By employing such calculation results as the pixel data of transformed pixel Q, a transformed image (enlarged image) is prepared. Such processing is called interpolation. The same description may be applied to the reduction.

The degree of sharpness enhancement which is required to obtain the same sharpness varies in response to the enlarging or reducing ratio in image processing, and by varying the degree of the sharpness enhancement in response to the enlarging or reducing ratio, it is possible to output images having optimal sharpness, irrespective of the enlarging or reducing ratio. Furthermore, depending on the interpolation algorithm, occasionally major problems occur due to moire phenomena caused by problems such as noise near the specified enlarging or reducing ratio. However, it is possible to minimize the generation of said moire problems by restricting the sharpness enhancing process near such ratio.

After the amplifying process, when the noise elimination process as well as the sharpness enhancing process is carried out, the higher the amplification ratio, the more the action is localized under the same processing conditions. As a result, it becomes difficult to recognize such effects. Therefore, the following measures are taken; the radius for calculation process increases; the pitch between adjacent pixels for smoothing increases; the threshold parameters increases; and the like. Furthermore, applied to the sharpness enhancing process are a coefficient in which a shift is carried out to enhance a frequency component is and a coefficient having an increased enhancement degree.

On the contrary, when the reduction ratio is large, the action covers a wide area under the same processing conditions to result in excessive effects. Therefore, the following measures are taken; the radius for calculation process decreases during elimination of noise; the pitch between adjacent pixels for smoothing decreases; the threshold parameters decreases, and the like. Furthermore, applied to the sharpness enhancing process are a coefficient in which limitation is carried out for a high frequency component and a coefficient having a small enhancement degree.

Further, when image information inputted from the input means 80 which inputs image information is subjected to image processing containing at least one sharpness enhancing process and a process in accordance with the service menu, and image data which have been subjected to said image processing are outputted to the output means 81 and conditions for the sharpness enhancing process change in response to the service menu (an output format), the condition of the sharpness enhancing process may be changed, for example, as shown in Table 7.

TABLE 7

| Service Menu | Conditions for Sharpness Enhancing Process | Content of Noise Elimination Control |
|---|---|---|
| Image output from media and digital camera | restraint of enhancement degree (compared hard copy) | decrease in threshold parameters (compared to hard copy) |
| Black-and-white and sepia prints | restraint of enhancement degree (compared to ordinary color print) | decrease in threshold parameters (compared to ordinary color prints) |
| Index prints | decrease in enhancement degree and concentration to the enhancement of high frequency (compared to ordinary color prints) | increase in threshold parameters as well as radius parameters and smoothing over a wide area (compared to ordinary color prints) |
| Identification photographs | restraint of enhancement degree (compared to ordinary prints) | increase in threshold parameters as well as radius parameters (compared to ordinary prints) |

For example, in portraits, or identification photos in which a person is the main subject, skin roughness is more minimized than for other general service pictures, and further soft pictures are preferred. Accordingly, for example, in the case of identification photo menu, it is possible to provide optimal quality images by varying conditions for the sharpness enhancing process in response to the service menu, while varying sharpness enhancement properties. Furthermore, it is possible to realize representations such as realistic photographic gradation representation, or printing matter gradation representation by varying the sharpness enhancing process by matching to a gradation control for photographic gradation, printing matter gradation, and the like.

Further, when image information inputted from the input means 80 which inputs image information is subjected to image processing containing at least one sharpness enhancing process, image data which have been subjected to image processing are outputted to the output means 81, and conditions for the sharpness enhancing process vary in response to the output means 81 on the basis of the type of the output means 81 and an output method (an output condition) for the image data, the conditions for the sharpness enhancing process may be changed as shown in Table 8.

TABLE 8

| Type of Output Means or Output Method | Conditions for Sharpness Enhancing Process | Content of Noise Elimination Control |
|---|---|---|
| Media writing | restraint of enhancement degree (compared to hard copy) | decrease in threshold parameters (compared to hard copy) |
| Management Items | | Image Processing Order/Frequency |
| Input Means | | |
| Means in which sharpness is much degraded | | Sharpness enhancement → Magnification → Sharpness enhancement |
| Means in which noise level is high | | Noise elimination → Magnification → Noise elimination |
| Means in which the degradation of high frequency component is large | | Magnification → Sharpness enhancement |
| Means in which the degradation of low frequency component is large | | Sharpness enhancement → Magnification |
| Means in which the noise level of high frequency component is large | | Magnification → Noise elimination |
| Means in which the noise level of low frequency component is large | | Noise elimination → Magnification |
| Image Capturing Conditions | | |
| Short image capturing time | | Noise elimination → Magnification → Noise elimination |
| Capturing of high resolution | | Magnification → Noise elimination → Sharpness enhancement |
| Type of Film | | |
| High-sensitive film | | Noise elimination → Magnification → Noise elimination |
| APS | | Magnification → Noise elimination → Sharpness enhancement |
| Reversal film | | (particularly, no control is required) |
| Density Condition of Image Information | | |
| High density film | | Noise elimination → Magnification → Noise elimination |
| S/N characteristics of Image Information | | |
| Low S/N | | Noise elimination → Magnification → Noise elimination |
| Magnifying and Reducing Ratio | | |
| High magnifying Ratio | | Sharpness enhancement → Magnification → Sharpness enhancement |
| Service Menu | | |
| Image output from media and digital camera | | Magnification → Sharpness enhancement (noise elimination is not required) |
| Black-and-white and sepia prints | | Luminance signal conversion Magnification → (each processing for luminance information) → Color signal conversion |
| Index prints | | Sharpness enhancement → Reduction |
| Identification photographs | | Noise elimination → Magnification → Noise elimination |
| Output Means | | |
| Media writing | | Noise elimination → enhancement |

It is possible to provide optimal quality images without employing the output means 81, as in such a manner that when for example, sharpness degradation properties during recording become different due to the output means 81 such as CRT 8, exposure processing section 4, recording media writing section 15, and the like, in advance, sharpness enhancement is carried out in response to those properties and conditions for the sharpness enhancing process vary in response to the output means 81.

Listed as those which can be used as an output means are print output by an exposure section and file (image data file)

output (including the case via network and the like) to various media, and display output to a CRT monitor. Specifically, output is carried out upon switching to optimal image processing conditions while matching the characteristics of each output device. In the case of file output, thereafter, the customer himself proceeds with photo retouching and other treatments. Therefore, in order to minimize the treatment process for input images in the possible range, the execution of the sharpness enhancing process as well as noise elimination is restrained to a lower level.

Cited as interpolation processing systems may be, for example, a nearest neighbor system, a bilinear system, a bicubic system, and the like.

The nearest neighbor system is nearest zero order interpolation, which gives pixel data of the nearest lattice among 4 pixels P1 through P4 around point P of unknown brightness. This system is capable of high speed operation due to its simple algorithm.

The bilinear system is 4-point linear interpolation as shown in FIG. 4(b), and data are obtained by linearly interpolating employing adjacent pixels P1 through P4 around P.

$$d(P) = [f_1(y) f_2(y)] \begin{bmatrix} d(P1) & d(P2) \\ d(P3) & d(P4) \end{bmatrix} \begin{bmatrix} f_1(x) \\ f_2(x) \end{bmatrix}$$

wherein $f_1$ and $f_2$ each represents an internal ratio which is given by the following equations and $d(\alpha)$ represents the data of pixel $\alpha$, for example, $d(P)$ represents the data of pixel P.

$f_1(t)=1-(t-[t])$ $f_2(t)=t-[t]$ $t=x, y$

When this system is employed, processed images are obtained which are smoother than the nearest neighbor system.

The bicubic system is three dimensional convolution interpolation. The three dimensional convolution interpolation as described herein is interpolation in which interpolation calculation is not carried out referring to only 4 adjacent pixels as in the nearest neighbor or bilinear system, but precise calculation is carried out referring to 16 pixels.

For simplicity, employing only one dimension, in the order of small coordinate value, points P1, P2, P3, and P4 are placed. Then, it should be understood that in such a manner one smooth curve passing 4 points is obtained by combining 4 different curves passing through 4 points.

Formulated as a basic curve is one by the following equation.

$$f_{(t)} \begin{cases} \dfrac{\sin \pi t}{\pi t} & (t \neq 0) \\ 1 & (t = 0) \end{cases}$$

This function exhibits such a curve, as shown in FIG. 6.

Figure 6A:
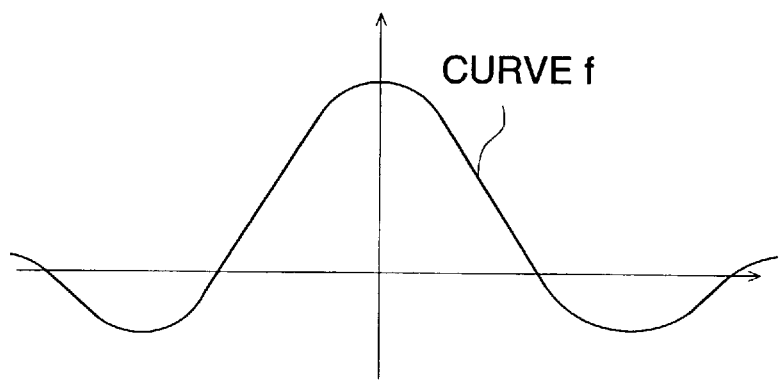
FIG. 6(a) is a view showing bicubic curve f.
Figure 6B:
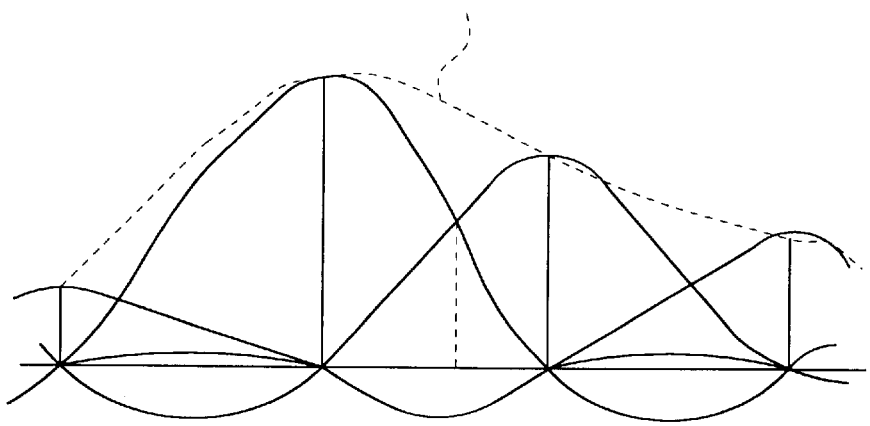
FIG. 6(b) is a view showing the composite of 4 bicubic curves.

Shown in FIG. 6(b), is an objective curve obtained by parallelly moving each of the central peaks shown in FIG. 6(a) to P1 through P4, multiplying the sizes of P1 through P4, and combining 4 curves.

Accordingly, said interpolation is calculated as:

$d(P)=d(P1)f_{(x1)}+d(P2)f_{(x2)}+d(P3)f_{(x3)}+d(P4)f_{(x4)}$

Figure 7:
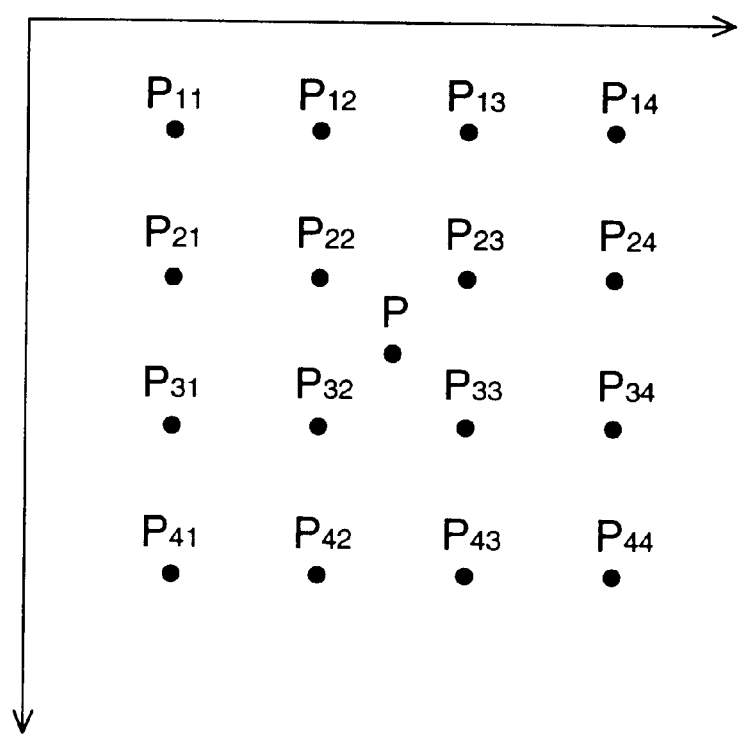
FIG. 7 is an illustration explaining a coordinate.

When this is applied to two dimensional interpolation, the following equation is obtained:

$$d(P) = [f_{(x1)} f_{(x2)} f_{(x3)} f_{(x4)}] \begin{bmatrix} d(P11) & d(P12) & d(P13) & d(P14) \\ d(P21) & d(P22) & d(P23) & d(P24) \\ d(P31) & d(P32) & d(P33) & d(P34) \\ d(P41) & d(P42) & d(P43) & d(P44) \end{bmatrix} \begin{bmatrix} f_{(y1)} \\ f_{(y2)} \\ f_{(y3)} \\ f_{(y4)} \end{bmatrix}$$

wherein each of x1 through x4 is an x-coordinate value of P obtained by placing the x-coordinate of each of Pn1, - - - Pn4 at the origin of the coordinates, and each of y1 through y4 is a y-coordinate value of P obtained by placing the x-coordinate of each of P1m, - - - P4m at the origin of the coordinates. Here, n and m are an integral number of 1 through 4 respectively and points of P11 through P44 are represented by FIG. 7.

When this technique is employed, processed images are obtained which are smoother and sharper at edge portions than those obtained by the nearest neighbor or bilinear interpolation technique.

Figure 5:
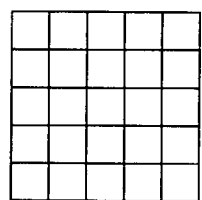
FIG. 5 is a view explaining calculation of spatial filtering.
Figure 5:
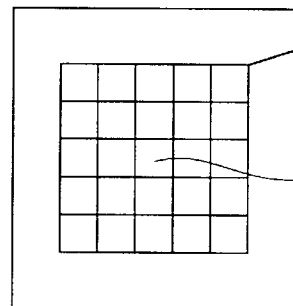
Figure 5:
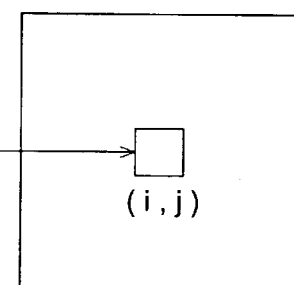

Furthermore, the sharpness enhancing process is preferably subjected to a spatial filtering process employing a spatial filter having no more than a 5×5 size. The size of the spatial filter is preferably no less than a 3×3 size and no more than a 5×5 size. One example of the spatial filtering process is shown in FIG. 5. FIG. 5 shows a spatial filtering calculation system. Operation for filtering inputted image f(m, n) employing load matrix W(k, l) is carried out as follows by a convolution calculation:

(i) first, load matrix W(k, l) is placed over f(m, n) so that the center of W(k, l) coincides with point (i, j) on f(m, n)

(ii) in the partial image of W(k, l) and f(m, n), on which W(k, l) is placed, each product of elements located in a corresponding position is obtained and the sum of these products is assigned as a value at the point (i, j) of output image g(m, n).

(iii) while moving the position of the load matrix by one pixel, operation (ii) is carried out at each position.

By carrying out such spatial filtering process of no more than a 5×5 size, the sharpness enhancing process can be realized at a high rate employing a low cost hardware resource.

Furthermore, the variation of the sharpness enhancing process is preferably realized by varying the coefficient of the spatial filter, specifically, by varying the coefficient of the spatial filter so as to obtain conditions for the sharpness enhancing process as shown in Tables 1 through 8. Image sharpness may be controlled by varying the enhancement degree at the edge portions by varying the spatial filtering coefficient.

"Variation in the magnitude of a spatial filtering coefficient" as described herein means that without substantially varying the frequency transfer characteristics of the spatial filter, all coefficients of the spatial filter are multiplied by a constant figure, and the magnitude of the filter coefficient among those in which the frequency transfer characteristics are substantially equal may be judged by the magnitude of the absolute value among arbitrarily corresponding coefficients. Furthermore, "frequency transfer characteristics are substantially equal" as described herein means that the coefficient arrangement pattern is analogous with each other, and the correlation coefficient among all coefficients (9 coefficients for a 3×3 filter and 25 coefficients for a 5×5 filter) should be at least 0.9.

Furthermore, in order to vary the sharpness enhancing process, the conditions for the sharpness enhancing process are preferably varied so that the spatial frequency characteristics of image data after the image enhancing process differ. The spatial frequency characteristics of the image data after the sharpness enhancing process are affected by the product of the spatial frequency transmission characteristic (which can be obtained by applying Fourier transformation to the spatial filter) of the spatial filter itself by that of the image data. Owing to this fact, in order to vary the spatial frequency characteristics of the image data after the sharpness enhancing process, the coefficient of the spatial filter may be varied. Furthermore, those which are anisotropic or asymmetrical may be set in response to the types of input means, input conditions, the types of output means, output conditions, and the like. In a low order filter, the content of the sharpness enhancing process is control-limited to the high frequency component. However, as the order of a filter increases, the freedom for setting of the coefficient increases to make it possible to control the low frequency component. In such a manner, by varying the conditions for the sharpness enhancing process, the granular appearance properties of an image due to noise and visual appearance vary. For example, when the enhancement degree of a low frequency component is relatively large, a granular appearance tends to be visually noticeable. However, moire phenomena accompanied with the enlarging or reducing process tend not to occur. On the other hand, when the enhancement degree of a high frequency component is relatively large, said granular appearance tends not to be visually noticed, while the moire phenomena accompanied with the enlarging and reducing process, tends to occur.

Furthermore, in the present embodiment, when image data are subjected to the noise elimination process, the image processing section 70 varies conditions for the noise elimination process, based on at least one of the image data capturing condition, the type of film on which image data are recorded, density corresponding to the image data on the film strip on which image data have been recorded, S/N characteristics of image data, the enlarging or reducing ratio in the enlarging or reducing process which is subjected to image data, the image output mode by the above-mentioned output device, and the output condition by the output device, while linking with the input means 80 (input conditions of image data inputted by the input means (the type of the input means, the conditions during input, and the like)).

The example of the specific algorithm of the noise elimination process will be described below.

In this image processing, employed as image data after processing, are calculation results obtained based on the image data in which the difference obtained by subsequently comparing the image data of a specified pixel to those of adjacent pixels.

EXAMPLE 1

Figure 8:
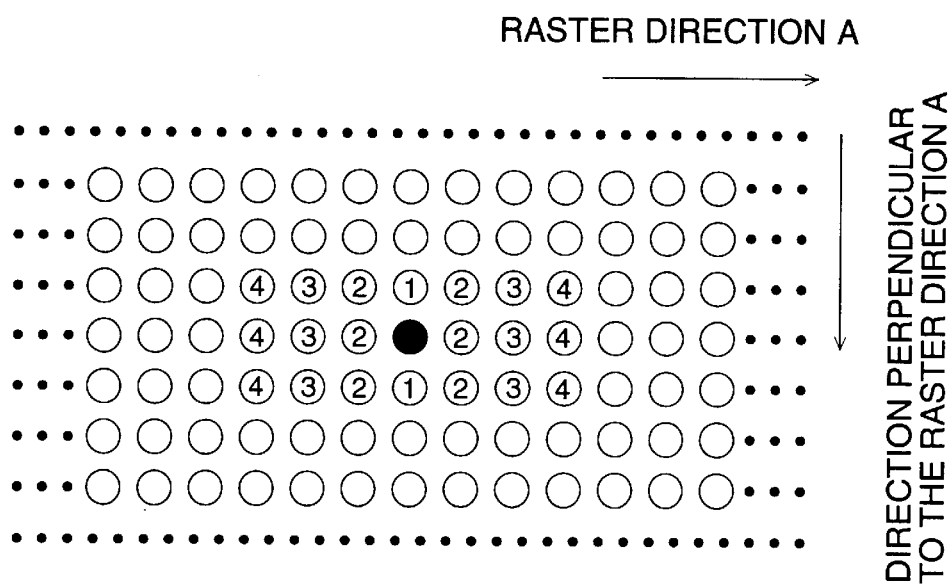
FIG. 8 is a diagram explaining an image processing in Example 1.

An image which is subjected to calculation for image processing is to be one marked with a black circle in FIG. 8. The calculation process starts from the upper side and from the left side to the right side (in the raster direction), and each image data of the lines above those marked with the black circle and to the left side on the same line are regarded as those which have been calculated.

First, the absolute value of the difference between each image data marked with ① and image data marked with a black circle is compared to the specified threshold value (though the threshold value itself is constant, it may be varied based on image data marked with the black circle) is compared to the predetermined threshold value, and when all threshold values are greater, all pixels marked with ① are those for smoothing. If this is not the case, image data marked with the black circle are accepted as the processing results.

When the image data marked with ① are accepted as an object for smoothing, subsequently, the absolute value of the difference between each image data marked with ② and image data marked with a black circle is compared to the predetermined threshold value. When all threshold values are grater, all pixels marked with ② are an object for smoothing. If not, the average of image data marked with the black circle and image data which have been an object for smoothing is accepted as processing results.

When the image data marked with ② is accepted as an object for smoothing, subsequently, the absolute value of the difference between each image data marked with ③ and image data marked with a black circle is compared to the predetermined threshold value. When all threshold values are greater, all pixels marked with ③ are accepted as an object for smoothing. If this is not the case, the average of image data marked with the black circle and image data which have been an object for smoothing are accepted as processing results.

When image data marked with ③ are accepted as an object for smoothing, the difference between each image data marked with ④ and the image data marked with a black circle is compared to the predetermined threshold values. When all threshold values are greater, all pixels marked with ④ are accepted as an object for smoothing. If this is not the case, the average of image data marked with the black circle and image data which have been an object for smoothing are accepted as processing results.

When the image data marked with ④ are an object for smoothing, the average of the image data marked with a black circle, including those marked with ④ and the image data which have been an object for smoothing are accepted as the processing results.

Further, when the average is calculated, the difference between the data for an object for smoothing and the image data marked with a black circle are integrated. The integration result is divided by the number of pixels for an object for smoothing plus 1 (corresponding to the black circle), and the result may be added to the image data. By so doing, the image data may be simply processed at high speed.

In such a case, if the previously prepared division table is utilized (in which the quotient can be subtracted from the dividend as well as from the divisor) shown in Table 1, high speed processing is possible even for a processing system in which the processing speed of the division is slow. While calculating the addition average, instead of carrying out the sequential division, image data may be processed at high speed, referring to the previously prepared table.

TABLE 1

| | | Division Table | | | | |
|---|---|---|---|---|---|---|
| | | Integrating Step | | | | |
| | | 0 | 1 | 2 | 3 | 4 |
| Absolute | 0 | 0 | 0 | 0 | 0 | 0 |
| Value of | 1 | 1 | 0 | 0 | 0 | 0 |
| Integrating | 2 | 2 | 0 | 0 | 0 | 0 |
| Value of | 3 | 3 | 1 | 0 | 0 | 0 |
| Difference | 4 | 4 | 1 | 0 | 0 | 0 |

TABLE 1-continued

Division Table

| | Integrating Step | | | | |
|---|---|---|---|---|---|
| | 0 | 1 | 2 | 3 | 4 |
| 5 | 5 | 1 | 0 | 0 | 0 |
| 6 | 6 | 2 | 0 | 0 | 0 |
| 7 | 7 | 2 | 0 | 0 | 0 |
| 8 | 8 | 2 | 0 | 0 | 0 |
| 9 | 9 | 3 | 1 | 0 | 0 |
| 10 | 10 | 3 | 1 | 0 | 0 |
| 11 | 11 | 3 | 1 | 0 | 0 |
| $20\times\epsilon$ | $20\times\epsilon$ | $\dfrac{20\times\varepsilon}{3}$ | $\dfrac{20\times\varepsilon}{9}$ | $\dfrac{20\times\varepsilon}{15}$ | $\dfrac{20\times\varepsilon}{21}$ |

($\epsilon$ represents a maximum threshold value)

The intergrating value of the difference shows an adjusting amount in the integrating step. When the integrating value of the difference is positive, the processing result is obtained by adding the original data to the adjusting amount, while when the integrating value of the difference is negative, the adjusting amount is subtracted from the original data.

When the processing result is applied to images which exhibit displeased granular appearance, it is possible to eliminate the granular appearance at extremely high speed without degrading the sharpness, so that it is possible to obtain high quality images.

In Example 1, the distance from the object pixel of a comparative pixel in direction B is limited perpendicular in the raster direction rather than the comparative object raster direction, and the effect for improving image quality is high, and further, it is possible to carry out high speed processing by shortening the processing time to obtain the desired effects.

Further, by employing image data which have been subjected to arithmetic processing, it is possible to process the image data of adjacent pixels at high speed, while resulting in excellent effects for the improvement in image quality, and further, decreasing the processing time to obtain the desired effects.

Further, the image data of a specified pixel is successively compared to the image data of adjacent pixels and the number of the image data in which the resulting difference do not exceed the predetermined value is limited to a specified number. Thus, it is possible to carry out high speed processing while resulting in excellent improvement in image quality, and further, in decreasing the processing time to obtain the desired effects.

By employing as the specified value in Example 1 one which varies based on the distance from the image data of an object pixel and/or the object pixel of a comparative pixel, it is possible to carry out image processing which results in excellent improvement in image quality.

When the object image is a color image composed of image data having a plurality of colors, a value different from the specified value is employed depending on the conditions of the combination of the image data of an object pixel. Furthermore, before the difference of the image data exceeds a specified value, the arithmetic processing is terminated when reaching the specified amount of image data. By so doing, it is possible to carry out high speed processing while resulting in excellent improvement in image quality, and further, in decreasing the processing time to obtain the desired effects.

EXAMPLE 2

Figure 9:
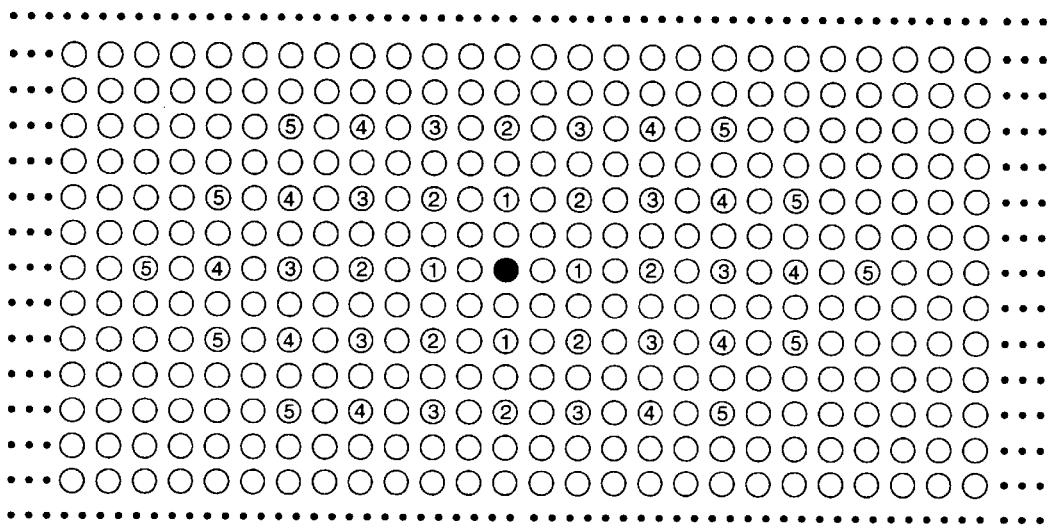
FIG. 9 is a diagram explaining an image processing in Example 2.

An object image for the calculation of image processing being marked by a black circle in FIG. 9, the calculation process starts from the upper side and from the left side to the right side (raster direction) in the same manner as Example 1, and each image data of the lines above those marked with the black circle and at the left side on the same line are regarded as those which have been calculated. Example 2 is subjected to processing steps similar to Example 1, thus the Division Table can be abbreviated.

The image processing in Example 2 is similar to that in Example 1. However, because the image data of adjacent pixels are successively employed at intervals, it is possible to carry out high speed processing while resulting in excellent improvement in image quality, and further, in decreasing the processing time to obtain the desired effects.

Example 2 resulted in markedly higher quality images than those read at a high resolution and exhibiting marked noise of the low frequency component, compared to Example 1.

Specific methods to vary conditions for minimizing noise are shown in Tables 1 through 8.

Further, in the present embodiment, the image processing section 70 varies the image processing order and image processing frequency, which are subjected to image data, based on at least one of the image data capturing conditions, the type of film on which image data are recorded, the density corresponding to the image data on the film on which the image data have been recorded, the S/N characteristics of image data, magnifying (or enlarging) or reducing ratio in the magnifying or reducing process which is subjected to image data, the image output mode by the above-mentioned output device, and the output conditions by the output device, while linking (input conditions (the types of input means, the conditions during input, and the like) of the image data inputted by the input means) with the input means 80. Tables 1 through 8 show the specific examples. Specifically, a processing procedure is determined by the combination of conditions of each item. In principle, the processing conditions corresponding to the conditions of each item are combined, however, when the resulting order is inconsistent, it is preferred to in advance determine an priority order among items and to select the items which have a high priority.

For each of the coefficient of the spatial processing filter for the sharpness enhancing process, the parameters for the noise elimination process, the interpolating algorithm for the amplifying and reducing process, the image processing frequency, and the image processing order, a table showing each specific value of the filter coefficient, the parameters for the noise elimination process, the interpolation algorithm for the amplifying and reducing process, the image processing frequency, and the image processing order is prepared so as to agree with Tables 1 through 8, and is stored in the data storing means 71. As an example of this Table, the coefficient of the spatial processing filter for the sharpness enhancing process and the parameters for the noise elimination process are shown in Tables 9 and 10, respectively.

TABLE 9

| Spatial processing Filter No. | Coefficient |
|---|---|
| 1 | ◯, ◯, ◯, ◯, ◯, ◯, ◯, ......... |
| 2 | ◯, ◯, ◯, ◯, ◯, ◯, ◯, ......... |
| 3 | ◯, ◯, ◯, ◯, ◯, ◯, ◯, ......... |
| 4 | ◯, ◯, ◯, ◯, ◯, ◯, ◯, ......... |
| ... | ..................................... |

TABLE 10

| Filter No. for Noise Elimination Process | Coefficient |
|---|---|
| 1 | function specifying No., threshold parameters, radius parameters, pitch, etc |
| 2 | ......, ......, ......, ...... |
| 3 | ......, ......, ......, ...... |
| 4 | ......, ......, ......, ...... |
| ... | ......, ......, ......, ...... |

TABLE 11

| | Read at Low Resolution | | | | |
|---|---|---|---|---|---|
| Range of Enlarging or Reducing Ratio | Spatial Processing Filter No. | Specification of Processing Order | Noise Elimination Mask | Processing Frequency | Amplifying or Reducing Interpolation Algorithm |
| 0–0.6 | ... | ... | ... | ... | ... |
| 0.6–0.9 | ... | ... | ... | ... | ... |
| 0.9–1.2 | ... | ... | ... | ... | ... |
| 1.2–1.5 | ... | ... | ... | ... | ... |
| 1.5–1.9 | ... | ... | ... | ... | ... |
| 1.9– | ... | ... | ... | ... | ... |
| | Read at Low Resolution | | | | |
| Range of Enlarging or Reducing Ratio | Filter No. | Specification of Processing Order | Noise Elimination Mask | Processing Frequency | Amplifying or Reducing Interpolation Algorithm |
| 0–0.6 | ... | ... | ... | ... | ... |
| 0.6–0.9 | ... | ... | ... | ... | ... |
| 0.9–1.2 | ... | ... | ... | ... | ... |
| 1.2–1.5 | ... | ... | ... | ... | ... |
| 1.5–1.9 | ... | ... | ... | ... | ... |
| 1.9– | ... | ... | ... | ... | ... |

Previously stored in the control section 7 is a table showing image processing parameters which relate to the image data input conditions inputted by a input means (types of input means, conditions during inputting, and the like), the conditions for capturing image data, the type of film on which image data are recorded, the density corresponding to the image data on a film strip on which image data are recorded, the S/N characteristics of image data, the enlarging or reducing ratio which is employed for enlarging or reducing image data, the image outputting mode employed by the above-mentioned output device, and the output conditions employed by the output device, enabling the image processing means 70 to select optimal processing parameters in response to the image data input conditions inputted by a input means (types of input means, conditions during inputting, and the like), the conditions for capturing image data, the type of film on which image data are recorded, the density corresponding to the image data on a film strip on which image data are recorded, the S/N characteristics of image data, the enlarging or reducing ratio which is employed for enlarging or reducing image data, the image outputting mode employed by the above-mentioned output device, and the output conditions employed by the output device. Table 11 shows an example of this. Table 11 is also an example of a table which is employed for selecting processing parameters in response to the amplifying and reducing ratio when the image data read by scanning a negative strip employing the negative film scanner 9 are subjected to image processing, including the amplifying and reducing process. In the same manner, stored in the control section 7 may be a table which is employed for varying the processing parameters in response to the image data input conditions (types of input means, conditions during inputting, and the like), the conditions for capturing image data, the type of film on which image data are recorded, the density corresponding to the image data on a film strip on which image data are recorded, the S/N characteristics of image data, the image outputting mode employed by the above-mentioned output device, and the output conditions employed by the output device.

From Table 11, the image processing means 70 selects a filter number, a specification of processing order, a noise elimination mask number, an amplifying and reducing algorithm number, an image processing frequency and the like in response to the image data input conditions inputted by an input means (types of input means, conditions during inputting, and the like), the conditions for capturing image data, the type of film on which image data are recorded, the density corresponding to the image data on a film strip on which image data are recorded, the S/N characteristics of image data, the enlarging or reducing ratio which is employed for enlarging or reducing image data, the image outputting mode employed by the above-mentioned output device, and the output conditions employed by the output device. The image processing means 70 further selects specific image processing parameters as shown in Tables 9 and 10, based on the filter number, the specification of processing order, the noise elimination mask number, the amplifying and reducing algorithm number, the image processing frequency and the like which are selected.

Further, in this embodiment, image information inputted from the input means 80 which inputs image information is subjected to image processing containing an enlarging or reducing process, image data which have been subjected to said image processing are outputted to the output means 81, and the interpolation algorithm for the enlarging or reducing process varies in response to the enlarging or reducing ratio in the image processing. Depending on the interpolation algorithm for the enlarging or reducing ratio for the image processing, major problems occasionally occur due to the moire phenomena which are caused by defects such as noise and the like near the specified enlarging or reducing ratio. In the region near such a ratio, the bicubic system may be employed which minimizes the generation of the moire phenomena and in the case other than that, the bilinear system and the nearest neighbor system may be applied. By so doing, the processing time may be reduced and may minimize the problems due to the generation of moire phenomena without decreasing the average processing capacity per hour to any appreciable extent.

Specifically, when the amplifying ratio is high, smoothness is much affected, and when the amplifying and reducing ratio is nearly 1, an integral multiple, or an integral fraction, a moire problem occurs. Therefore, in accordance with the amplifying ratio, a control, which avoids an interpolation method resulting in said problem, may be carried out. For example, in principle, linear interpolation is accepted from the viewpoint of processing speed, and at the ratio at which the moire problem occurs, a method employing uniform smoothing interpolation may be employed. Effects obtained by employing these interpolation methods, in the present embodiment, are shown below.

The range of the amplifying ratio in which the uniform smoothing is employed have been registered in advance and during amplifying and pasting, the interpolation algorithm may be selected, referring to its content. Further, because sharpness is somewhat affected by the interpolation algorithm, the conditions for the sharpness enhancing process may be further subjected to control.

| Interpolation Method | Smoothness | Sharpness | Processing Speed | Moire |
|---|---|---|---|---|
| Nearest Neighbor | C | A | A | C |
| Linear | A | B | A | C |
| Cubic Convolution | A | A | C | B |
| Uniform (9 points) | A | B | B | A |
| Uniform Smoothing (5 points) | A | B | B | A |

The specific method of uniform smoothing will be described below.

Figure 10:
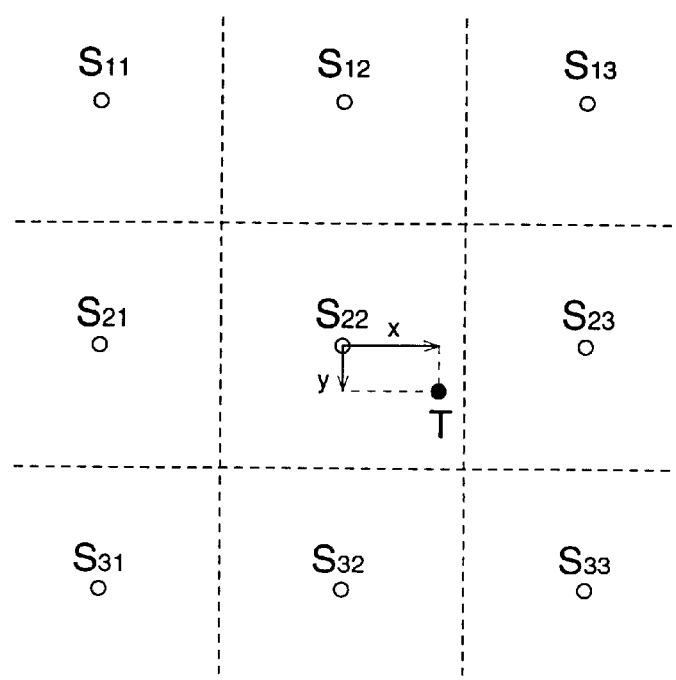
FIG. 10 is a diagram explaining a smoothing manner uniform interpolation method (part 1).

Next, the smoothing manner uniform interpolation method (part 1) will be described The sampling point nearest interpolation point T is represented by $S_{22}$ and the sampling points around $S_{22}$ are determined as shown in FIG. 10. A coordinate system having $S_{22}$ as the point of origin is determined, and the coordinate value of each sampling point $S_{ji}$ (i=1, 2 or 3, j=1, 2 or 3) in the horizontal direction is represented by $x_{ji}$ ($x_{ji}=-1$, $x_{j2}=0$ and $xj_3=+1$), and the coordinate value in the perpendicular direction is represented by $y_{ji}$ ($y_{ji}=-1$, $y_{j2}=0$, and $y_{j3}=+1$) and each sampling value is represented by $z_{ji}$. The horizontal coordinate of interpolation points are represented by x, and interpolated values are represented by z, wherein $$X_1=\{-3x+2-\sqrt{(1-3x^2)}\}/6$$

$$X_2=\{1+\sqrt{(1-3x^2)}\}/3$$

$$X_3=\{3x+2-\sqrt{(1-3x^2)}\}/6$$

$$Y_1=\{-3y+2-\sqrt{(1-3y^2)}\}/6$$

$$Y_2=\{1+\sqrt{(1-3y^2)}\}/3$$

$$Y_3=\{3x+2-\sqrt{(1-3y^2)}\}/6$$

An interpolation equation is defined as;

$$z = \sum_j \sum_i X_i Y_j z_{ji}$$

In the above equation, for arbitrary x and y, the following equations are held.

$$\sum_j \sum_i X_i Y_j = 1$$

$$\sum_j \sum_i (X_i Y_j)^2 = 1/4$$

$$\sum_j \sum_i X_i Y_j x_{ji} = x$$

$$\sum_j \sum_i X_i Y_j y_{ji} = Y$$

Next, the smoothing manner uniform interpolation method (part 2) will be described.

Figure 11:
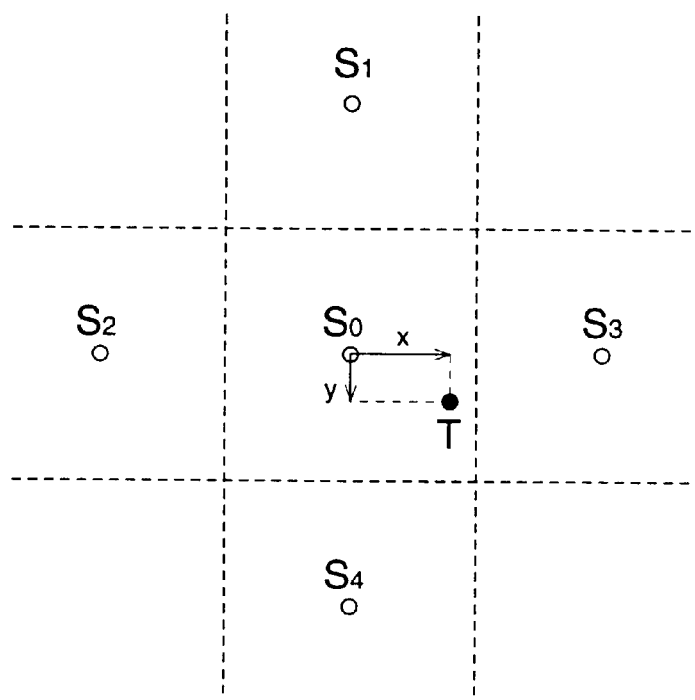
FIG. 11 is a diagram explaining a smoothing manner uniform interpolation method (part 2).

The sampling point nearest interpolation point T is represented by $S_{22}$ and sampling points around $S_{22}$ are determined as shown in FIG. 11. A coordinate system having $S_{22}$ as the point of origin is determined, and the coordinate value of each sampling point $S_{ji}$ (i=1, 2 or 3, j=1, 2 or 3) in the horizontal direction is represented by $x_{ji}$ ($x_{ji}=-1$, $x_{j2}=0$ and $x_{j3}=+1$), and the coordinate value in the perpendicular direction is represented by $y_{ji}$ ($y_{ji}=-1$, $y_{j2}=0$, and $y_{j3}=+1$) and each sampling value is represented by $z_{ji}$. The horizontal coordinate of interpolation points are represented by x, and interpolated values are represented by z, Herein, when the following equations are held, $$K_x=\{4+5(|x|-|y|)\}/20-\sqrt{[16\{1-5(|x|-|y|)\}^2-80\{2(x^2+y^2)+6(|x|-|y|)\}^2-2(|x|-|y|)-1\}]}/80$$

$$K_y=\{4+5(|x|-|y|)\}/20-\sqrt{[16\{1-5(|x|-|y|)\}^2-80\{2(x^2+y^2)+6(|x|-|y|)\}^2-2(|x|-|y|)-1\}]}/80$$

the interpolation equation is expressed by $$z=(1-2K_x-2K_y)z_0+(K_y-y/2)z_1+(K_x-x/2)+(K_x-x/2)+(K_y-y/2)z_4$$

In the above equation, the following equation is held for arbitrary x and y;

$$(1-2K_x+2K_y)^2+(K_y-y/2)^2+(K_x-x/2)^2+(K_x-x/2)^2+(K_y-y/2)^2=12$$

The evaluation results for a print prepared by a 1.05 amplification ratio are shown. In the linear interpolation method used as the comparative example, processing time was shorter, but moire occurred markedly. In the image having a high noise level, it was possible to visually recognize a checker pattern. Further, in the smoothed manner uniform interpolation method (part 1) of the example of the present invention, though the processing time became longer, the formation of moire decreased and in the image having a high noise level, the checker pattern almost disappeared. In the smoothed manner uniform interpolation method (part 2) of the example of the present invention, though the processing time became somewhat longer, the formation of moire disappeared and in images having a high level of noise, the checker pattern almost disappeared.

In the present embodiment, image information inputted from the input means 80, which inputs image information, is subjected to image processing containing processes in response to the enlarging or reducing process and service menu and image data which have been subjected to said image processing are outputted to the output means 81, and the interpolation algorithm for enlarging or reducing process is varied in response to the service menu. Depending on the interpolation algorithm during magnification or reduction in the image processing, major problems occur occasionally due to the moire phenomena which are caused by defects such as noise and the like near the specified enlarging or reducing ratio. However, for a service such as identification photo menu in which the order quantity is small, the problems are minimized by employing the bicubic system which is not likely to generate the moire phenomena, and in cases other than that, by employing the bilinear system or the nearest neighbor system, the processing time may be decreased and thereby raise the average processing capacity per hour.

Due to the fact that the noise level is high and an image is composed of dots, moire occasionally results in extraordinary big problems. Therefore, for negative strips having abnormally high density (due to over-exposure) or abnormally low density (due to under-exposure) in "Negative Print Copy Service", and for printed original documents in "Print Copy Service", control is carried out employing uniform smoothing. Regarding conditions for the application, a condition setting table is previously prepared for each service and when the conditions are valid, the uniform smoothing may be employed as a measure to counter moire formation.

As described above, in the invention described in items 1 and 15, it becomes possible to output high quality images with higher sharpness by varying conditions of the sharpness enhancing process in response to the input means.

In the invention described in items 2 and 16, it becomes possible to output high quality images with higher sharpness by varying conditions of the sharpness enhancing process in response to image capturing conditions for image information which have been inputted to the input means.

In the invention described in items 3 and 17, it becomes possible to output high quality images with higher sharpness by varying conditions of the sharpness enhancing process in response to storage time of the captured images.

In the invention described in items 4 and 18, it becomes possible to output high quality images with higher sharpness by varying conditions of the sharpness enhancing process in response to the type of film.

In the invention described in items 5 and 19, it becomes possible to output high quality images with higher sharpness by varying conditions of the sharpness enhancing process in response to the density of image information recorded on the film.

In the invention described in items 6 and 20, it becomes possible to output high quality images with higher sharpness by varying sharpness enhancing conditions.

In the invention described in items 7 and 21, it is possible to output images with appropriate sharpness, irrespective of the enlarging or reducing ratio by varying conditions of the sharpness enhancing process in response to the enlarging or reducing ratio in the image processing.

In the invention described in items 8 and 22, it is possible to provide optimal quality images by varying conditions of the sharpness enhancing process in response to the service menu, and to achieve expressions such as more realistic photographic gradation expression, printing matter gradation expression, and the like by varying the sharpness enhancing process in response to gradation processing such as photographic gradation, printing matter gradation, and the like.

In the invention described in items 9 and 23, when sharpness degradation properties during recording are different, due to the output means, sharpness enhancement is previously carried out in response to said properties, and it is thereby possible to provide optimal quality images irrespective of the output means by varying conditions of the sharpness enhancing process.

In the invention described in items 10 and 24, by carrying out a spatial filtering process of no more than 5×5 size, the sharpness enhancing process can be realized at a high rate employing a low cost hardware resource.

In the invention described in items 11 and 25, the sharpness of images can be controlled by varying the enhancement degree of edge portions upon varying the magnitude of the spatial filtering coefficient.

In the invention described in items 12 and 26, the granular appearance properties or image appearance is varied by varying the frequency characteristics of the sharpness enhancing process. For example, when the enhancement degree of a low frequency component is relatively large, a visually noticeable granular appearance tends to result, but the moire phenomena tend not to occur. On the hand, when the enhancement degree of the high frequency component is relatively large, granular appearance tends not to be visually noticeable, but the moire phenomena accompanied with an enlarging or reducing process tends to occur.

In the invention described in items 13 and 27, depending on the interpolation algorithm for the enlarging or reducing ratio for the image processing, major problems occasionally occur due to the moire phenomena which are caused by defects such as noise and the like near the specified enlarging or reducing ratio. In the region near such a ratio, the bicubic system may be employed which minimizes the generation of the moire phenomena, and in cases other than that, the bilinear system and the nearest neighbor system may be applied. By so doing, the processing time may be reduced and may minimize said problems due to the generation of moire phenomena without decreasing the average processing capacity per hour to any appreciable extent.

In the invention described in items 13 and 37, depending on the interpolation algorithm during magnification or reduction for the image processing, major problems occasionally occur due to the moire phenomena which are caused by defects such as noise and the like near the specified enlarging or reducing ratio. However, in the service such as identification photo menu in which the order quantity is small, said problems are minimized by employing the bicubic system which is not likely to generate the moire phenomena, and in cases other than that, by employing the bilinear system or the nearest neighbor system, the processing time may be decreased and increase the average processing capacity per hour.

What is claimed is:

1. An image processing system for printing an image on a sheet in response to a request of a customer, said image processing system comprising:

an input device to input a printing request and image data based on image information contained in an image recording medium received together with the printing request from the customer, wherein the printing request includes at least one of a kind of the image recording medium, a type of an image output device and a kind of a print;

an image processing device having a memory storing a plurality of sharpness enhancing process conditions predetermined for plural kinds of image recording mediums, plural types of printing devices and plural kinds of prints, wherein the image processing device selects a corresponding sharpness enhancing process condition predetermined for the inputted printing request from the plurality of sharpness enhancing process conditions and conducts sharpness enhancing processing of the image data based on the corresponding sharpness enhancing process condition; and a printing device to print an image on a sheet based on the processed image data.

2. The image processing system of claim 1, wherein the input device receives the print request and the image data through a network from the customer.

3. The image processing system of claim 1, wherein the plural kinds of the image recording mediums include a color negative film, a color reversal film, a color paper, a PC card and a floppy disk.

4. The image processing system of claim 1, wherein the input device further inputs a type of an image scanner used to read an image on one of a color negative film, a color reversal film and a color paper, wherein the memory of the image processing device further stores a plurality of sharpness enhancing process conditions predetermined for plural types of image scanners, and wherein the image processing device conducts the sharpness enhancing processing of the image data based on the corresponding sharpness enhancing process condition in accordance with the input type of image scanner.

5. The image processing system of claim 4, wherein the input device further inputs an image reading condition on which the image scanner reads an image, and wherein the image processing device conducts the sharpness enhancing of the image data based on the corresponding sharpness enhancing process condition in accordance with the input image reading condition.

6. The image processing system of claim 5, wherein the image reading condition is a storage time for the image data.

7. The image processing system of claim 1, wherein the plural types of printing devices include a photographic printing device, a ink-jet printer and an electrophotographic printing device.

8. The image processing system of claim 1, wherein the plural kinds of prints include a regular photographic print, a black and white print, a sepia print, an index print and an identification photographic print.

9. The image processing system of claim 1, wherein the image processing device records the processed image in one of a magnetic recording medium and an optical recording medium, wherein the memory of the image processing device stores a plurality of sharpness enhancing process conditions predetermined for the magnetic recording medium and the optical recording medium, and wherein the image processing device conducts the sharpness enhancing processing of the image data based on the corresponding sharpness enhancing process condition in accordance with the utilized one of the magnetic recording medium and the optical recording medium.

10. The image processing system of claim 3, wherein the input device further inputs at least one of: (i) an image density of an image on one of a color negative film, a color reversal film and a color paper, and (ii) a S/N characteristic of the image data, wherein the memory of the image processing device stores a plurality of sharpness enhancing process conditions predetermined for a plurality of image densities and a plurality of S/N characteristics, and wherein the image processing device conducts the sharpness enhancing processing of the image data based on the corresponding sharpness enhancing process condition in accordance with the input at least one of the image density and the S/N characteristic.

11. The image processing system of claim 1, wherein the image processing device further conducts one of an enlarging process and a reducing process for the image data, wherein the memory of the image processing device stores a plurality of sharpness enhancing process conditions predetermined for the enlarging process and reducing process, and wherein the image processing device conducts the sharpness enhancing processing of the image data based on the corresponding sharpness enhancing process condition in accordance with the conducted one of the enlarging process and reducing process.

12. The image processing system of claim 1, wherein the image processing device conducts the sharpness enhancing processing using a space filter having a size of no more than 5×5.

13. The image processing system of claim 1, wherein the image processing device conducts the sharpness enhancing processing by changing a size of a space filter in accordance with the sharpness enhancing process condition.

14. The image processing system of claim 1, wherein the image processing device further conducts one of an enlarging process and a reducing process and also conducts a noise eliminating process, and wherein the image processing device changes a sequential order of the sharpness enhancing processing, the enlarging or reducing process and the noise eliminating process or a number of times of conducting same in accordance with the sharpness enhancing process condition.

* * * * *